United States Patent
Ishii et al.

(10) Patent No.: US 7,460,474 B2
(45) Date of Patent: Dec. 2, 2008

(54) PACKET TRANSMISSION CONTROL APPARATUS AND PACKET TRANSMISSION CONTROL METHOD

(75) Inventors: Hiroyuki Ishii, Yokosuka (JP);
Yoshimasa Imamura, Yokohama (JP);
Akihito Hanaki, Yokohama (JP);
Takehiro Nakamura, Yokosuka (JP);
Shinya Tanaka, Yokohama (JP);
Masafumi Usuda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 646 days.

(21) Appl. No.: 10/969,013

(22) Filed: Oct. 21, 2004

(65) Prior Publication Data

US 2005/0141421 A1  Jun. 30, 2005

(30) Foreign Application Priority Data

Oct. 21, 2003  (JP) ............................. 2003-361261

(51) Int. Cl.
*G01R 31/08* (2006.01)
*G06F 11/00* (2006.01)
*G08C 15/00* (2006.01)

(52) U.S. Cl. .................... 370/230; 370/234; 370/235; 370/236

(58) Field of Classification Search ................ 370/230, 370/234, 231–233, 235–236
See application file for complete search history.

(56) References Cited

U.S. PATENT DOCUMENTS

| 7,035,249 | B2 * | 4/2006 | Christensen et al. ......... 370/352 |
| 2003/0083069 | A1 * | 5/2003 | Vadgama ................... 455/436 |
| 2003/0135632 | A1 * | 7/2003 | Vrzic et al. ................ 709/231 |
| 2003/0227926 | A1 * | 12/2003 | Ramamurthy et al. .. 370/395.42 |
| 2004/0017825 | A1 * | 1/2004 | Stanwood et al. ........... 370/468 |
| 2004/0114555 | A1 * | 6/2004 | Hayashi et al. ............. 370/329 |
| 2004/0208183 | A1 * | 10/2004 | Balachandran et al. . 370/395.21 |
| 2005/0141421 | A1 | 6/2005 | Ishii et al. |

FOREIGN PATENT DOCUMENTS

| CN | 1315788 A | 10/2001 |
| CN | 1422092 A | 6/2003 |
| JP | 3-58646 | 3/1991 |
| JP | 2003-163632 | 6/2003 |

OTHER PUBLICATIONS

Jack M. Holtzman, "CDMA Forward Link Waterfilling Power Control", IEEE VTC2000 Spring, 2000, pp. 1663-1667.
"3GPP TR 25.848 V4.0.0" $3^{RD}$ Generation Partnership Project; Technical Specification Group Radio Access Network; Physical layer aspects of UTRA High Speed Downlink Packet Access, Mar. 2001, pp. 1-89.
"3GPP C.S0024", version 2.0, cdma 2000 High Rate Packet Data Air Interface Specification, Oct. 27, 2000, the whole document.
U.S. Appl. No. 10/969,013, filed Oct. 21, 2004, Ishii et al.
U.S. Appl. No. 11/019,443, filed Dec. 23, 2004, Ishii et al.
U.S. Appl. No. 11/063,846, filed Feb. 23, 2005, Ishii et al.
U.S. Appl. No. 11/579,992, filed Nov. 9, 2006, Ishii, et al.

* cited by examiner

*Primary Examiner*—Firmin Backer
*Assistant Examiner*—Farah Faroul
(74) *Attorney, Agent, or Firm*—Oblon, Spivak, McClelland, Maier & Neustadt, P.C.

(57) ABSTRACT

A packet transmission control apparatus which performs transmission control of packets to a plurality of mobile stations includes an acquirer configured to acquire an average transmission rate of packets to each of the mobile stations and a guaranteed transmission rate of the packets; and a scheduler configured to perform scheduling to transmit packets to a specific mobile station preferentially, when an average transmission rate of the packets to the specific mobile station approaches the guaranteed transmission rate.

20 Claims, 9 Drawing Sheets

FIG. 7

| TYPE # | WHEN TO RENEW $\bar{R}_n$ | CALCULATION METHOD OF $r_n$ |
|---|---|---|
| 1 | AT EVERY TTI WITHIN CONNECTING TIME | SIZE OF PACKET WHOSE DELIVERY COULD BE ACKNOWLEDGED |
| 2 | AT EVERY TTI WITHIN CONNECTING TIME | SIZE OF TRANSMITTED PACKET |
| 3 | AT EVERY TTI WITHIN CONNECTING TIME | SAME AS $R_n$ |
| 4 | AT TTI WHERE SCHEDULING-RELATED CALCULATION IS CARRIED OUT | SIZE OF PACKET WHOSE DELIVERY COULD BE ACKNOWLEDGED |
| 5 | AT TTI WHERE SCHEDULING-RELATED CALCULATION IS CARRIED OUT | SIZE OF TRANSMITTED PACKET |

PACKET TRANSMISSION CONTROL APPARATUS AND PACKET TRANSMISSION CONTROL METHOD

CROSS REFERENCE TO RELATED APPLICATION

This application is based upon and claims the benefit of priority from the prior Japanese Patent Application No. P2003-361261, filed on Oct. 21, 2003; the entire contents of which are incorporated herein by reference.

BACKGROUND OF THE INVENTION

1. Field of the Invention

The present invention relates to a packet transmission control apparatus and a packet transmission control method which perform transmission control of packets to a plurality of mobile stations.

The present Invention relates particularly to a packet transmission control apparatus and a packet transmission control method which perform transmission control (scheduling) of downlink packets in a mobile communication system.

2. Description of the Related Art

In a downlink of a mobile communication system, one physical channel can be shared among mobile stations which belong to the radio base station. Hereinafter, the physical channel used in such a case is called a "downlink shared channel".

In this downlink shared channel, the radio base station controls the transmission order of packets to the plurality of mobile stations with which the radio base station communicates, in accordance with an Instantaneous radio quality between the radio base station and each mobile station, so as to improve throughput that the radio base station can provide, in other words, a system capacity.

This control of packet transmission order by the radio base station is called "scheduling". It is known that, by applying the scheduling to packet transmission, channel capacity increases, or communication quality improves.

Generally, it is considered that the conventional scheduling targets on packets in which requirements for transmission delays are not so strict.

Incidentally, with regard to standardization of the third generation mobile communication system, so-called IMT-2000, there are "3GPP/3GPP2 (Third-Generation Partnership Project/Third-Generation Partnership Project 2)". Standard specifications have been developed as "W-CDMA system" in the 3GPP, and standard specifications have been developed as "ocdma2000 system" in the 3GPP2.

In the 3GPP, "HSDPA (High Speed Downlink Packet Access)", which is a high-speed packet transmission system in the downlink direction, has been standardized based upon a prospect that high-speed and high-capacity traffic will increase especially in the downlink due to downloading from databases and websites and the like, as the Internet has rapidly expanded in recent years.

Moreover, in the 3GPP2, "1x-EV DO", which is a transmission system only for high-speed data in the downlink direction, has been standardized from the same viewpoint as above. In the "1x-EV DO" of the cdma2000 system, "DO" means "Date Only".

For example, in the HSDPA, a scheme for controlling a modulation scheme and a coding rate of respective radio channels in accordance with radio condition between each mobile station and a radio base station (this scheme is called, for example, AMCS (Adaptive Modulation and Coding Scheme) in the HSPDA), and the scheduling which is operated in a cycle of few milliseconds, are used as a combination. Thus, it is possible to improve throughput for individual mobile stations as well as throughput of the entire system.

"Round Robin Scheduler" is widely known as a scheduling algorithm in a radio base station. The "Round Robin Scheduler" controls the transmission order of packets waiting for transmission, by assigning the downlink shared channel sequentially to mobile stations (for example, mobile stations #1 to #2 to #3 . . . ) which belong to the radio base station.

Moreover, "Proportional Fairness scheduler" and "Max C/I (Maximum C/I) Scheduler" are known as scheduling algorithms in a radio base station. The "Proportional Fairness Scheduler" and the "Max C/I Scheduler" control the transmission order of packets waiting for transmission based upon the radio condition between the radio base station and each mobile station and the average transmission rate of packets to each mobile station.

The "Proportional Fairness Scheduling" is a scheduling algorithm which assigns a transmission queue and also supports fairness amongst the mobile stations, in accordance with instantaneous changes in downlink conditions of the individual mobile stations.

Hereinbelow, The "Proportional Fairness Scheduling" is briefly described with reference to FIG. 1. FIG. 1 is a flowchart showing the operation of the "Proportional Fairness Scheduler" mounted on a radio base station.

In the "Proportional Fairness Scheduling", a value of an evaluation function of each mobile station which belongs to the radio base station is calculated based upon the measured radio condition between each mobile station and the radio base station and the measured average transmission rate of packets to each mobile station, and thereafter, a transmission queue is assigned to a mobile station maximizing the value of the evaluation function.

As shown in FIG. 1, in step S1001, the radio base station sets initial values as follows:

n=1 (n: a subscript of a mobile station)

$C_{max}=0$ ($C_{max}$: a maximum value of an evaluation function $C_n$)

$n_{max}=0$ ($n_{max}$: a subscript of the mobile station maximizing the value $C_n$ of the evaluation function)

In step S1002, the radio base station measures elements required in calculating the value $C_n$ of the evaluation function, specifically, an instantaneous radio condition $R_n$ between the radio base station and each mobile station #n, and an average transmission rate $\overline{Rn}$ of packets to each mobile station #n.

In step S1003, the radio base station calculates the value $C_n$ of the evaluation function, by using the values measured in the step S1002, according to the following equation.

$$Cn = \frac{Rn}{\overline{Rn}}$$

In step S1004, the radio base station determines whether the value $C_n$ of the evaluation function calculated in the step S1003 exceeds a maximum value $C_{max}$ of the evaluation function.

Here, $C_{max}=0$. Therefore, the determination in the step S1004 is YES, and in step S1005, the radio base station sets the value $C_n$ of the evaluation function calculated in the step S1003 at the maximum value $C_{max}$ of the evaluation function, and also sets "1" at "$n_{max}$".

Thereafter, in step S1006, the radio base station increments "n" by "+1", and determines whether "n" exceeds "N (the number of mobile stations communicating with the radio base station)" in step S1007.

Where "n" does not exceed "N", the operation repeats the steps from S1002 to S1006, thus obtaining N values of the evaluation function sequentially.

In step S1008, the radio base station selects a mobile station #$n_{max}$ maximizing the value $C_n$ of the evaluation function, and assigns a transmission queue to the mobile station #$n_{max}$.

A radio base station, on which the "Proportional Fairness Scheduler" is mounted, assigns a transmission queue to each mobile station #n while downlink quality (radio condition) is relatively good. Therefore, higher throughput can be expected in comparison with a radio base station with the "Round Robin Scheduler" mounted thereon.

Furthermore, in the "Proportional Fairness Scheduling", the radio condition between the radio base station and each mobile station is divided by the average transmission rate of packets to each mobile station, thus lowering the value of the evaluation function of a mobile station with high average transmission rate. Thus, the transmission queue can be assigned with high fairness in terms of time, compared to the "MAX C/I Scheduling" as describe later.

Meanwhile, the "MAX C/I Scheduling" is a scheduling algorithm which assigns a transmission queue to a mobile station with the best downlink quality (radio condition) amongst mobile stations which belong to the radio base station.

In other words, in the "MAX C/I Scheduling", the same processing as that of the "Proportional Fairness Scheduler" is carried out except that the evaluation function $C_n$ in the processing of the "Proportional Fairness Scheduler" is set so that "$C_n=R_n$".

In the case of the "MAX C/I Scheduler", a transmission queue is assigned to a mobile station with good downlink quality at the beginning of a scheduling cycle.

Normally, a transmission rate of respective packets gets higher depending on the quality of a link. Therefore, in the "MAX C/I Scheduling", a transmission opportunity is provided to a mobile station with the highest transmission rate.

However, in the "MAX C/I Scheduler", few transmission opportunities are provided to a mobile station with poor average downlink quality, such as a mobile station located remotely from the radio base station. This causes a problem in that throughput obtained at each mobile station is extremely different from one other.

In other words, the "MAX C/I Scheduler" causes a situation where a mobile station located in the vicinity of the radio base station can obtain extremely good throughput, whereas the remaining mobile stations obtain low throughput.

As described so far, in the conventional mobile communication system, the scheduling has been carried out by setting the above-mentioned evaluation function in consideration of the type of service provided and priority related to the type of the service, based upon the "Round Robin Scheduler", the "Proportional Fairness Scheduler", or the "MAX C/I Scheduler".

In the conventional mobile communication system, not only the evaluation function of one scheduling algorithm, such as the evaluation function of the "Proportional Fairness Scheduling" or the evaluation function of the "MAX C/I Scheduling" is selected, but also an evaluation function which is intermediate between the evaluation functions of the "Proportional Fairness Scheduling" and the "MAX C/I Scheduling" is sometimes selected.

For example, in the conventional mobile communication system, radio condition $R_n$ between the radio base station and each mobile station #n, and an average transmission rate $\overline{Rn}$ of packets to each mobile station #n are used to set an evaluation function according to $$Cn = \frac{Rn^\alpha}{\overline{Rn}^\beta},$$

where $\alpha$ and $\beta$ are adjusted within a range of $0 \leq \alpha, \beta \leq 1$. Thus, it is possible to employ a scheduling method which, for example, controls a degree of fairness provided by the denominator and an effect of user diversity provided by the numerator.

Furthermore, in the conventional communication system, another index (for example, a buffering time of a packet waiting for transmission) may be added to the evaluation function to carry out the scheduling.

Meanwhile, the high-speed packet transmission system like the "HSDPA" and the "1x-EV DO" is generally a communication system of the Best Effort type. This type of transmission system provides packet transmission with a high transmission rate where the number of mobile stations for assignment is small, and provides packet transmission with a low transmission rate where the number of mobile stations for assignment is large.

However, in this high-speed packet transport system, it has also been considered that a service like a streaming service and a VoIP service is to be provided. In such a service, a predetermined requirement for transmission delay should be satisfied.

In other words, in the above high-speed packet transmission system, it is required to set a guaranteed transmission rate to guarantee a minimum transmission rate of packets for a predetermined type of service.

In such a case, the mobile communication system is required to execute its control to guarantee a minimum transmission rate of 64 kbps of packets to an arbitrary mobile station using, for example, a streaming service.

However, in the conventional scheduling algorithms (the "Round Robin Scheduling", the "MAX C/I Scheduling", and the "Proportional Fairness Scheduling", there is not a function which provides a specific type of service or a specific mobile station with a guaranteed transmission rate. Therefore, there has been a problem in that QoS (Quality of Service) cannot be provided to a streaming service, a VoIP service and the like.

BRIEF SUMMARY OF THE INVENTION

In viewing of the foregoing, it is an object of the present invention to provide a packet transmission control apparatus and a packet transmission control method which are enabled to provide a guaranteed transmission rate while performing the conventional scheduling algorithm.

A first aspect of the present invention is summarized as a packet transmission control apparatus which performs transmission control of packets to a plurality of mobile stations. The packet transmission control apparatus includes: an acquirer configured to acquire an average transmission rate of packets to each of the mobile stations and a guaranteed transmission rate of the packets; and a scheduler configured to perform scheduling to transmit packets to a specific mobile station preferentially, when an average transmission rate of the packets to the specific mobile station approaches the guaranteed transmission rate.

A second aspect of the present invention is summarized as a packet transmission control method for performing transmission control of packets to a plurality of mobile stations. The method includes: acquiring an average transmission rate of packets to each of the mobile stations and a guaranteed transmission rate of the packets, and performing scheduling to transmit packets to a specific mobile station preferentially, when an average transmission rate of the packets to the specific mobile station approaches the guaranteed transmission rate.

BRIEF DESCRIPTION OF THE SEVERAL VIEWS OF THE DRAWINGS

FIG. 7 is a view for explaining an operation of a mobile station transmission rate calculating unit of the MAC-hs processing unit within the base band signal processing unit in the radio base station according to the first embodiment of the present invention.

DETAILED DESCRIPTION OF THE INVENTION

<Configuration of Packet Transmission Control Apparatus According to the First Embodiment of the Present Invention>

The configuration of a packet transmission control apparatus according to a first embodiment of the present invention is described below, with reference to the drawings.

Note that "$R_n^{target}$" and "$R_n^{minus}$" in this specification do not mean "$R_n$" to the "target" power and "$R_n$" to the "minus" power, but mean "$R_n^{target}$" and "$R_n^{minus}$", respectively, which correspond to a subscript "n".

Figure 1:
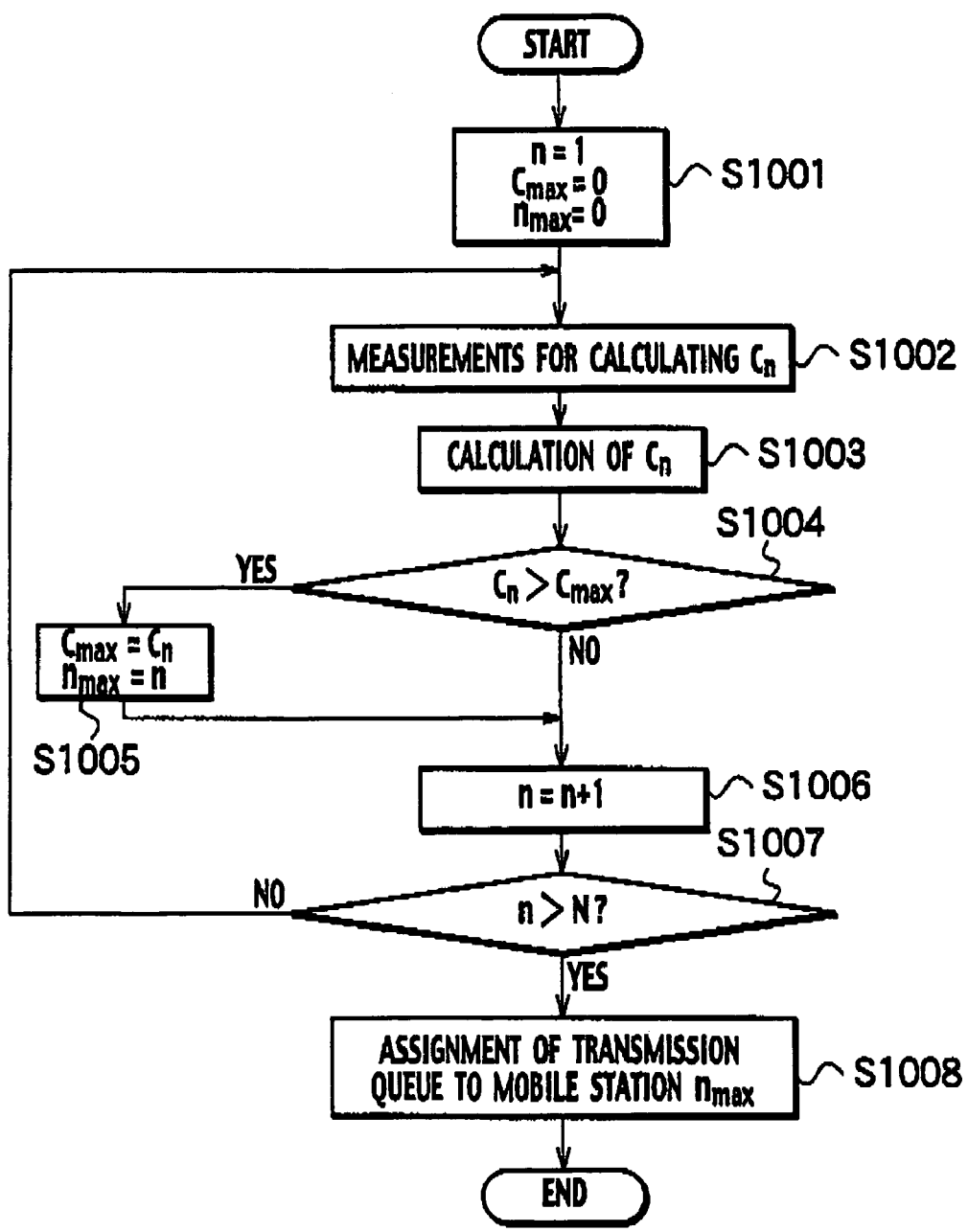
FIG. 1 is a flowchart showing an operation of an MAC-hs processing unit within a base band signal processing unit in a radio base station according to a prior art.
Figure 2:
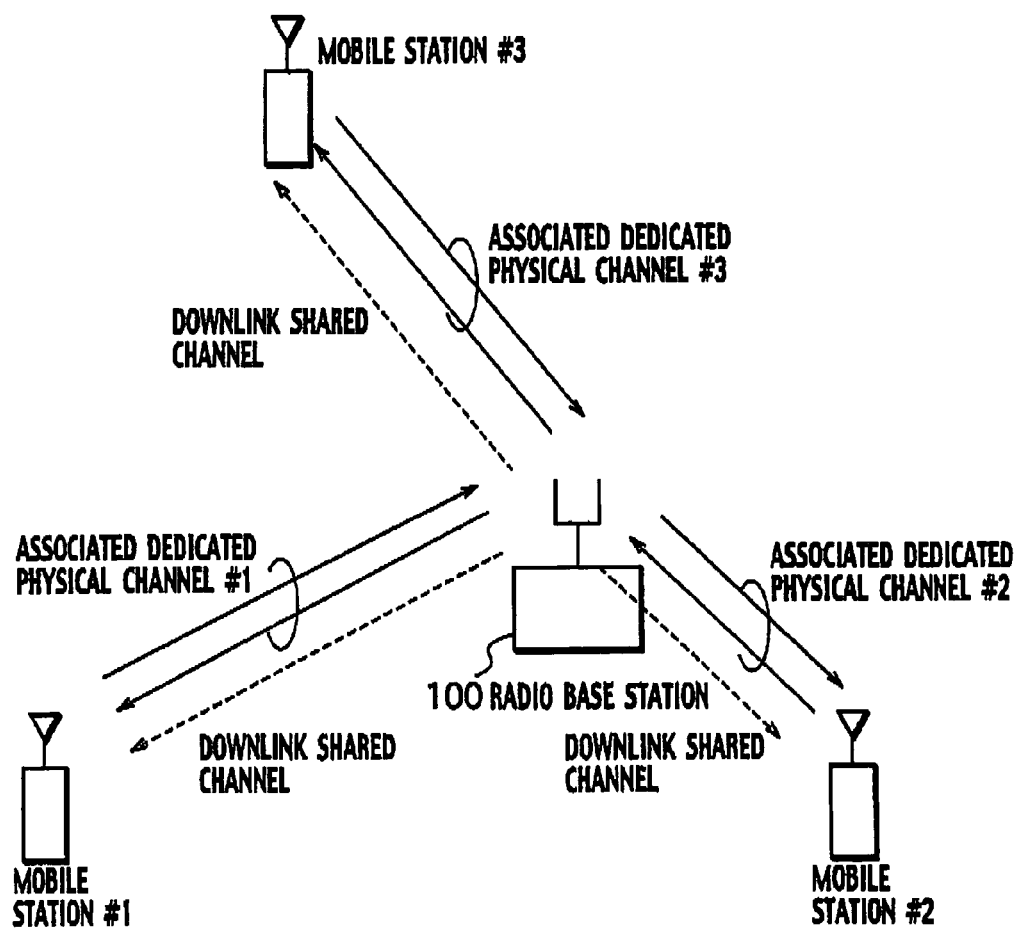
FIG. 2 is a view of the entire configuration of a mobile communication system according to a first embodiment of the present invention.

FIG. 2 is a view showing an example of the configuration of a mobile communication system in which the packet transmission control apparatus according to the first embodiment of the present invention is provided.

In FIG. 2, this mobile communication system is configured with a radio base station 100 and a plurality of mobile stations #1 to #3, and employs the "HSDPA". In the first embodiment, description is given regarding an example where the above-described packet transmission control apparatus is provided in the radio base station 100.

In downlink packet transmission in the "HSDPA", used are a downlink shared channel (DSCH) or a high speed-DSCH (HS-DSCH), and associated dedicated physical channels #1 to #3 (bidirectional channels in uplink and downlink directions) associated with a physical channel (DSCH or HS-DSCH). Each of the associated dedicated physical channels #1 to #3 is assigned to the individual mobile stations #1 to #3, respectively.

In the uplink directions of the associated dedicated physical channels #1 to #3, transmitted are not only user data, but also pilot symbols, transmission power control commands (TPC commands) for transmission of downlink associated dedicated physical channels, downlink quality information used for scheduling of the shared channel and AMCS (Adaptive Modulation and Coding Scheme), and the like.

On the other hand, in the downlink directions of the associated dedicated physical channels #1 to #3, transmission power control commands (TPC commands) for transmission of the uplink associated dedicated physical channels and the like are transmitted.

In the first embodiment, the respective mobile stations #1 to #3 have the same configuration and function. Therefore, they are described as the mobile station(s) #n (n≧1) unless otherwise specified.

Figure 3:
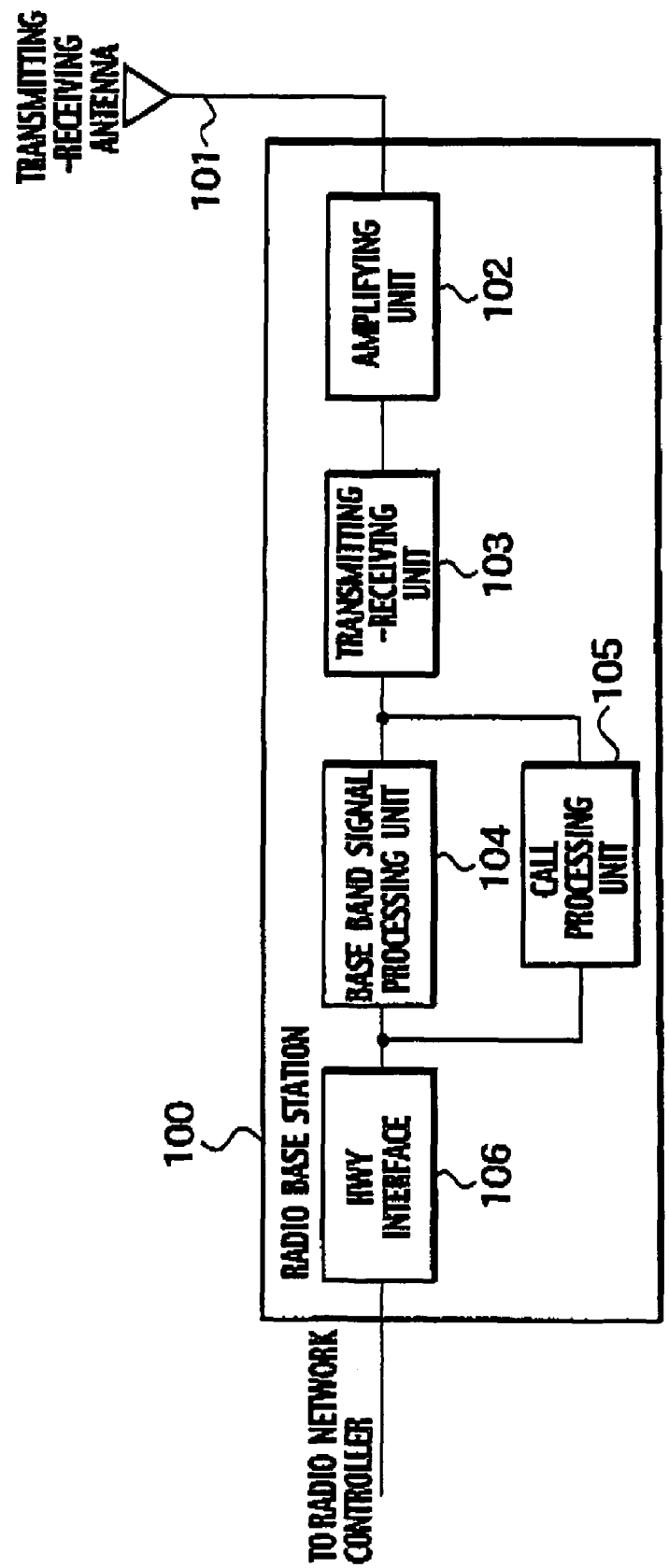
FIG. 3 is a functional block diagram of a radio base station according to the first embodiment of the present invention.

FIG. 3 is a functional block diagram showing an example of the configuration of the radio base station 100 shown in FIG. 2.

In FIG. 3, the radio base station 100 includes a transmitting-receiving antenna 101, an amplifying unit 102, a transmitting-receiving unit 103, a base band signal processing unit 104, a call processing unit 105, and an HWY interface 106.

The transmit-receive antenna 101 is configured to transmit a downlink radio frequency signal containing the downlink shared channel, downlink associated dedicated physical channels #1 to #3, and the like, to the respective mobile stations #1 to #3. The transmit-receive antenna 101 is also configured to receive an uplink radio frequency signal containing the downlink associated dedicated physical channels #1 to #3 and the like, from the respective mobile stations #1 to #3.

The amplifying unit 102 is configured to amplify the downlink radio frequency signal outputted from the base band signal processing unit 104, and to transmit the amplified signal to the transmit-receive antenna 101.

The amplifying unit 102 is also configured to amplify the uplink radio frequency signal from the transmit-receive antenna 101, and to transmit the amplified signal to the base band signal processing unit 104.

The transmitting-receiving unit 103 is configured to transmit a base band signal to the base band signal processing unit 104. The base band signal is obtained by converting the frequency of the uplink radio frequency signal outputted from the amplifying unit 102.

The transmitting-receiving unit 103 is configured to transmit the downlink radio frequency signal to the amplifying unit 102. The downlink radio frequency signal is obtained by converting the frequency of the base band signal, outputted from the base band signal processing unit 104, into a radio frequency band.

The base band signal processing unit 104 is configured to provides downlink packets, outputted from the HWY interface, with retransmission control (HARQ (Hybrid ARQ)) processing, scheduling processing, transmission format and resource selecting processing, error-correction coding processing, spreading processing and the like, and then transfers the packets to the transmitting and receiving unit 103.

The base band signal processing unit 104 is also configured to provide the base band signal, outputted form the transmitting-receiving unit 103, with despreading processing, RAKE combining processing, error-correction decoding processing, and the like, and transfers the signal to the HWY interface 106.

Figure 4:
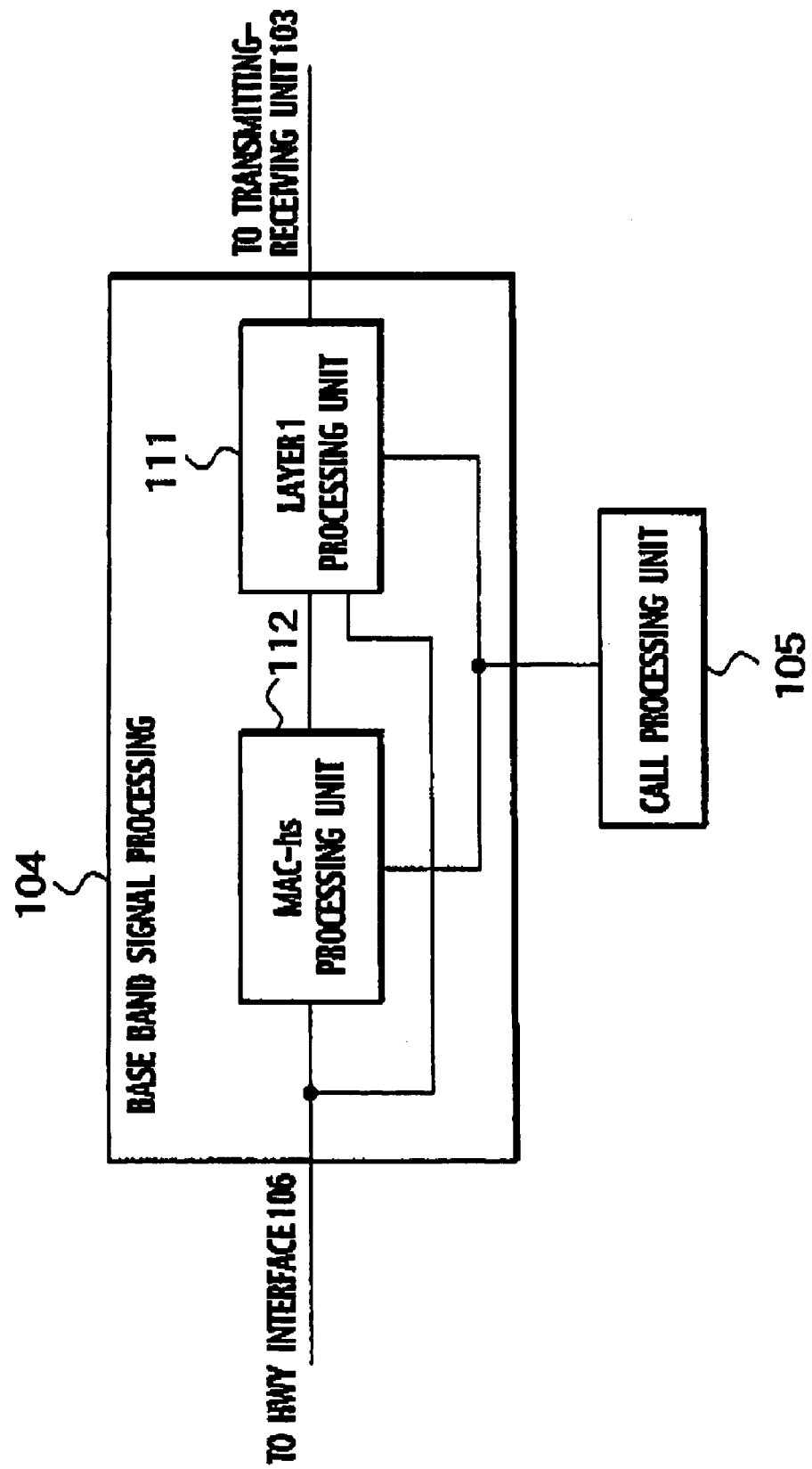
FIG. 4 is a functional block diagram of a base band signal processing unit in the radio base station according to the first embodiment of the present invention.

FIG. 4 shows the functional configuration of the base band signal processing unit 104. Specifically, as shown in FIG. 4, the base band signal processing unit 104 includes a layer 1 processing unit 111 and an MAC-hs (Medium Access Control-HSDPA) processing unit 112. Both of the layer 1 processing unit 111 and the MAC-hs processing unit 112 are connected to the call processing unit 105.

The layer 1 processing unit 111 is configured to provide the downlink packets with error-correction coding processing and spreading processing, to provide the uplink packets with despreading processing, error-correction decoding process and RAKE combining processing, and to provide the associated dedicated physical channels in both directions with transmission power control processing.

Further, the layer 1 processing unit 111 is configured to receive information indicating a downlink radio condition. This information is reported, being carried on a control bit field specifically for an uplink dedicated physical channel from each mobile station. The layer 1 processing unit 111 then outputs the information to an evaluation function calculating unit 180 of the MAC-hg processing unit 112.

Here, the information indicating the radio condition include, for example, instantaneous receipt SIR (signal-to-interference ratio), BLER (Bit Error Rate), CQI (Channel Quality Indicator) and the like.

The MAC-hs processing unit 112 is configured to provide retransmission control (HARQ) processing of the downlink shared channel in HSDPA, scheduling processing for packets waiting for transmission, and transmission format and resource selection processing.

Figure 5:
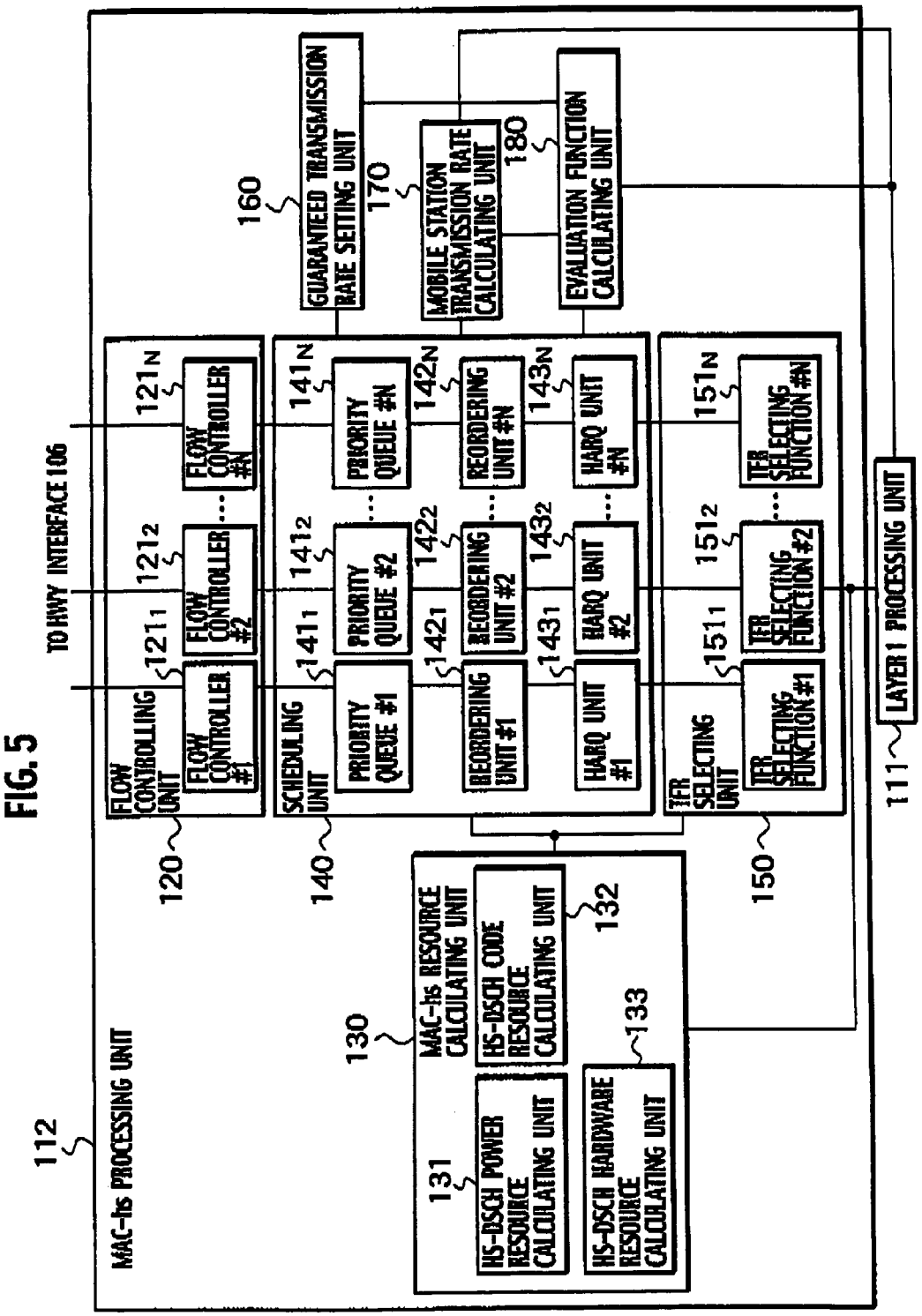
FIG. 5 is a functional block diagram of an MAC-hs processing unit within the base band signal processing unit in the radio base station according to the first embodiment of the present invention.

FIG. 5 shows the functional configuration of the MAC-hs processing unit 112. As shown in FIG. 5, the MAC-ha processing unit 112 includes a flow controlling unit 120, an MAC-hs resource calculating unit 130, a scheduling unit 140, a TFR (transmission format and resource) selecting unit 150, a guaranteed transmission rate setting unit 160, a mobile station transmission rate calculating unit 170 and the evaluation function calculating unit 180.

The flow controlling unit 120 includes a plurality of flow controllers (#1 to #N) 121$_1$ to 121$_N$, and has a function of adjusting a transmission rate of downlink packets, which has been received from a radio network controller through the HWY interface 106, based upon a capacity of an implemented transmission queue (buffer) and the like.

The respective flow controllers (#1 to #N) 121$_1$ to 121$_N$ monitor the flow of downlink packets. Once the flow of downlink packets increases, and the free space in the transmission queue (buffer) is reduced, the flow controllers 121$_1$ to 121$_N$ perform processing for suppressing the volume of packets to be transmitted.

Note that the flow controls (#1 to #N) 121$_1$ to 121$_N$ correspond to connections #1 to #N between the radio base station and the mobile stations #1 to #N, respectively.

The MAC-hs resource calculating unit 130 is configured to calculate radio resources (a power resource, a code resource, a hardware resource and the like) to be assigned to HS-DSCH, and to include an HS-DSCH power resource calculating unit 131 which calculates the power resource, an HS-DSCH code resource calculating unit 132 which calculates the code resource, and an HS-DSCH hardware resource calculating unit 133 which calculates the hardware resource.

The scheduling unit 140 is configured to provide downlink packets to be transmitted to each mobile station, with scheduling processing.

As described later, in the first embodiment, when an average transmission rate of packets to a specific mobile station approaches a guaranteed transmission rate, the scheduling unit 140 performs the scheduling processing so that the packets to the specific mobile station are transmitted preferentially.

For example, the scheduling unit 140 may be configured to select a mobile station #n to which packets are preferentially transmitted, based upon a relationship between a radio condition between the radio base station and the mobile station, and a difference between an average transmission rate of packets to the mobile station and a guaranteed transmission rate.

The scheduling unit 140 may also be configured to select the mobile station #n to which packets are preferentially transmitted, based upon a relationship amongst a radio condition between the radio base station and the mobile station, a difference between an average transmission rate of packets to the mobile station and a guaranteed transmission rate, and a value of $R_n^{minus}$ which is described later.

As described later, the scheduling unit 140 provides scheduling processing for downlink packets to be transmitted to each mobile station, based upon the evaluation function related to each mobile station. The evaluation function is calculated by the evaluation function calculating unit 180.

Specifically, the scheduling unit 140 selects a mobile station #n maximizing the value $C_n$ of the evaluation function amongst the respective mobile stations. Thereafter, the scheduling unit 140 assigns a priority queue 141 to the mobile station #n (that is, the scheduling unit 140 carries out assignment of downlink transmission).

As shown in FIG. 5, the scheduling unit 140 has N priority queues (#1 to #N) 141$_1$ to 141$_N$, N reordering units (#1 to #N) 142$_1$ to 142$_N$, and N HARQ units (#1 to #N) 143$_1$ to 143$_N$.

The priority queues (#1 to #N) 141$_1$ to 141$_N$, the reordering units (#1 to #N) 142$_1$ to 142$_N$, and the HARQ units (#1 to #N) 143$_1$ to 143$_N$ correspond to connections #1 to #N between the radio base station and the mobile stations #1 to #N, respectively.

The priority queues (#1 to #N) 141$_1$ to 141$_N$ are transmission queues provided in the connections, respectively. In other words, the priority queues (#1 to #N) 141$_1$ to 141$_N$ are configured to accumulate downlink packets until they are selected by the scheduling processing.

Normally, one priority queue is used for one mobile station. However, a plurality of priority queues are used for one mobile station when a plurality of connections are set in one mobile station.

The reordering units (#1 to #N) 142$_1$ to 142$_N$ are configured to give sequence numbers to downlink packets so that the mobile station #n can execute receiving order control processing for the downlink packets in the retransmission control processing using HARQ. The reordering units also perform window control processing to prevent a receive buffer overflow in the mobile station #n.

The HARQ units (#1 to #N) $143_1$ to $143_N$ are configured to perform the retransmission control processing by using a stop-and-wait protocol ARQ of M process, based upon ACK/NACK feedback in the uplink direction.

An example of the operation of the stop-and-wait protocol ARQ performed in the HARQ units (#1 to #N) $143_1$ to $143_N$ is described with reference to FIG. 6.

Figure 6:
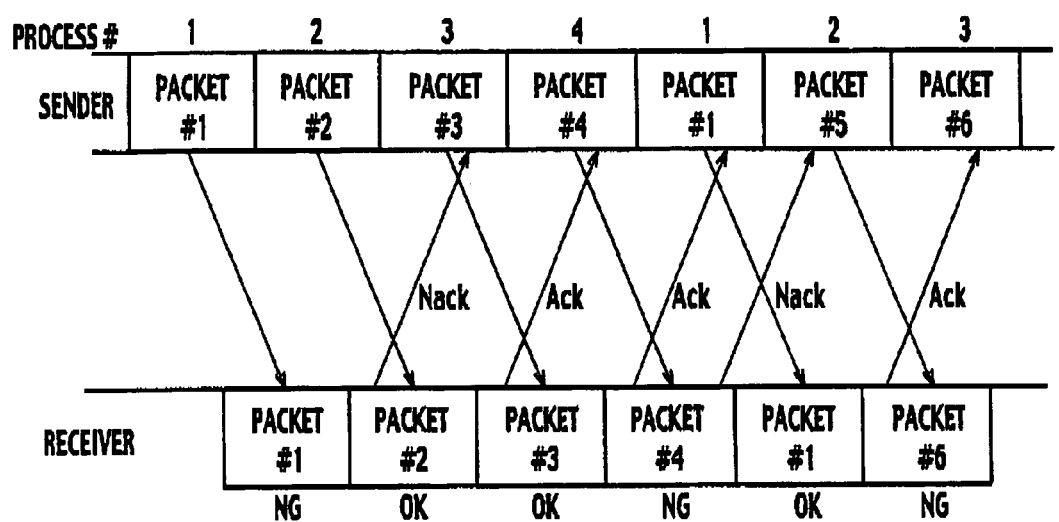
FIG. 6 is a view for explaining an operation of an HARQ unit of the MAC-hs processing unit within the base band signal processing unit in the radio base station according to the first embodiment of the present invention.

As shown in FIG. 6, in the stop-and-wait protocol ARQ, a receiver receives packets from a sender and then returns transmission acknowledgements (ACK/NACK) to the sender.

In the example of FIG. 6, the receiver could not receive a packet #1 correctly and thus returns a negative acknowledgement (NACK) to the sender. Meanwhile, the receiver could receive a packet #2 correctly, and thus returns an acknowledgement (ACK) to the sender. The receiver repeats the operation of returning ACK or MACK to the sender in the order of received packets.

The TFR selecting unit 150 includes N TFR selecting functions (#1 to #N) $151_1$ to $151_N$. The TFR selecting functions (#1 to #N) $151_1$ to $151_N$ correspond to the connections #1 to #N between the radio base station and the mobile stations #1 to #N, respectively.

The TFR selecting functions (#1 to #N) $151_1$ to $151_N$ are configured to decide a downlink transmission format (a number of codes, a modulation scheme, a coding rate and the like) and radio resources which are used in the respective connections #1 to #N, based upon the CQI which is an indicator of the downlink quality received through an uplink channel, the radio resources (a power resource, a code resource, a hardware resource) to be assigned to HS-DSCH which are calculated in the MAC-hs resource calculating unit 130, and the like.

The respective TFR selecting functions (#1 to #N) $151_1$ to $151_N$ notify the layer 1 processing unit 111 of the decided downlink transmission format and radio resources.

The guaranteed transmission rate setting unit 160 is configured to set a guaranteed transmission rate $R_n^{target}$ corresponding to the minimum transmission rate to be guaranteed with respect to downlink packets within the priority queues $141_1$ to $141_N$.

The guaranteed transmission rate setting unit 160 may be configured to set the guaranteed transmission rate $R_n^{target}$ in accordance with remote designation through the call processing unit 105.

The guaranteed transmission rate setting unit 160 may also be configured to set the guaranteed transmission rate $R_n^{target}$ for each service type, each contract type, each terminal type, each cell type, or each priority class.

For example, the service types mean the types of services for transfer of downlink packets, and include a VoIP service, a voice service, a streaming service, a FTP service, and the like.

The contract types mean the types of contracts that users of destination mobile stations of downlink packets have signed, and include a low-class contract, a high-class contract and the like.

The terminal types classify the destination mobile stations of the downlink packets. The terminal types include, for example, classes based upon identification of the mobile stations, types depending on presence/absence or types of a RAE receiving function, an equalizer, a receive diversity, an interference canceller and the like, and types depending on terminal capabilities such as a receivable modulation scheme, a code number, and the number of bits.

The cell types mean the types of forms of calls where the destination mobile stations of downlink packets are located. The cell types include classes based upon identification of the cells, cells in the indoors or the outdoors, cells in a suburban or urban district, or cells in a high-traffic region or low-traffic region, and the like.

The priority classes mean priorities related to transmission of downlink packets. For example, downlink packets with the first priority are transmitted preferentially over downlink packets with the second priority.

Moreover, when $$\overline{Rn} \leq Rn^{target}$$

($\overline{Rn}$: average transmission rate, $Rn^{target}$: guaranteed transmission rate), the guaranteed transmission rate setting unit 160 sets the value $R_n^{minus}$ to be set as the denominator of the evaluation function, for each priority queue $141_1$ to $141_N$.

The guaranteed transmission rate setting unit 160 can set the guaranteed transmission rate $R_n^{minus}$ at a higher transmission rate than a minimum transmission rate to be actually guaranteed, in order to guarantee the minimum transmission rate with additional reliability.

The guaranteed transmission rate setting unit 160 can also set the guaranteed transmission rate $R_n^{minus}$ at a lower transmission rate than the minimum transmission rate to be actually guaranteed, in order to guarantee the minimum transmission rate with an appropriate fairness.

Moreover, the guaranteed transmission rate setting unit 160 may be configured to set the guaranteed transmission rate $R_n^{minus}$ for (later-described) each calculation method of an instantaneous transmission rate $r_n$ of packets to each mobile station #n.

The mobile station transmission rate calculation unit 170 is configured to calculate an average transmission rate $$\overline{Rn}$$

of downlink packets to the mobile station #n, according to $$\overline{Rn}(t) = \delta \cdot \overline{Rn}(t-1) + (1-\delta) rn \quad \text{(Equation 1)}$$

Where $\delta$ is a predetermined parameter which designates a section where averaging processing is performed, and also indicates a forgetting factor ($0 \leq \delta \leq 1$) for the averaging processing. By controlling $\delta$, the level of fairness provided by the scheduler can be controlled.

For example, when the value of $\delta$ is set at "0.9999", the section where the average transmission rate of packets to each mobile station are calculated becomes larger than a section obtained when the value of $\delta$ is set at "0.99". As a result, fairness amongst the mobile stations over a long period of time is taken into consideration, thus operating the scheduler with high fairness in terms of time.

Conversely, if the section where the average transmission rate of packets to a mobile station is reduced, in other words, if the value of $\delta$ is reduced, fairness amongst the mobile stations In a short period of time is taken into consideration. Hence, it becomes possible to operate the scheduler with low fairness in terms of time.

This parameter $\delta$ can be set for downlink packets within the priority queues $141_1$ to $141_N$, based upon the service types, the contract types, the terminal types, the cell types, the priority classes and the like.

In the above (Equation 1), $r_n$ represents an Instantaneous transmission rate of packets to a mobile station #n.

The instantaneous transmission rate $r_n$ of packets to the mobile station #n is any one of the following: a size (data size) of packets, the delivery acknowledgment of which from the mobile station #n has been received; a size of packets transmitted to the mobile station #n; and a size of transmittable packets calculated (estimated) based upon the radio condition $R_n$ between the radio base station and the mobile station #n (or the radio condition $R_n$ between the radio base station and the mobile station #n).

The mobile station transmission rate calculating unit 170 is configured to renew the average transmission rate of packets at each predetermined transmission time interval or at each time interval at which the evaluation function used for scheduling of packets is calculated.

The mobile station transmission rate calculating unit 170 is also configured to calculate the instantaneous transmission rate $r_n$ of the packets, which is used for renewal of the average transmission rate of the packets.

For example, the mobile station transmission rate calculating unit 170 is configured to renew the average transmission rate of packets in the patterns of the types #1 to #5 as shown in FIG. 7.

In the pattern of the type #1, the mobile station transmission rate calculating unit 170 renews the average transmission rate of packets, by calculating the size of packets, the delivery acknowledgement of which from the mobile station #n has been received, at every TTI (transmission time interval).

In the pattern of the type #2, the mobile station transmission rate calculating unit 170 renews the average transmission rate of packets, by calculating the sizes of packets transmitted to the mobile station #n, at every TTI.

In the pattern of type #3, the mobile station transmission rate calculating unit 170 renews the average transmission rate of packets, by calculating the size of transmittable packets calculated (estimated) based upon the radio condition $R_n$ between the radio base station and the mobile station #n (or the radio condition $R_n$ between the radio base station and the mobile station #n), at every TTI.

In the pattern of type #4, the mobile station transmission rate calculating unit 170 renews the average transmission rate of packets, by calculating the size of packets, the delivery acknowledgement of which from the mobile station #n has been received. The size of the packets is calculated at each time interval at which the evaluation function used for scheduling of packets is calculated.

In the pattern of type #5, the mobile station transmission rate calculating unit 170 renews the average transmission rate of packets, by calculating the size of packets transmitted to the mobile station #n. The size of the packets is calculated at each time interval at which the evaluation function used for scheduling of packets is calculated.

The mobile station transmission rate calculating unit 170 may also be configured to obtain the instantaneous transmission rate $r_n$ of packets to the mobile station #n, by a method apart from the above.

For example, after the mobile station #n starts communicating, the mobile station transmission rate calculating unit 170 can measure the data size of packets in a data link layer, in each predetermined period, so as to obtain the instantaneous transmission rate rn of packets to the mobile station #n. Then, the packets are addressed to the mobile station #n, and the packets are flown into the MAC-hs processing unit 112.

In such a case, the MAC-hs processing unit 112 is required to have a function of measuring the transmission rate of the packets in the data link layer.

The evaluation function calculating unit 180 is configured to calculate the value $C_n$ of the evaluation function used in the scheduling processing performed by the scheduling unit 140.

The call processing unit 105 is configured to transmit and receive call processing signals to/from the radio network controller located in the upper position of the radio base station 100. The call processing unit 105 is also configured to manage the condition of the radio base station 100, and to assign the radio resources to the radio base station 100.

The HWY interface 106 is configured to serve as an interface between the radio network controller and the radio base station 100.

The HWY interface 106 is configured to transfer downlink packets received from the radio network controller to the base band signal processing unit 104, and to transfer uplink packets received from the base band signal processing unit 104 to the radio network controller.

<Operation of Packet Transmission Control Apparatus According to the Present Embodiment>

Figure 8:
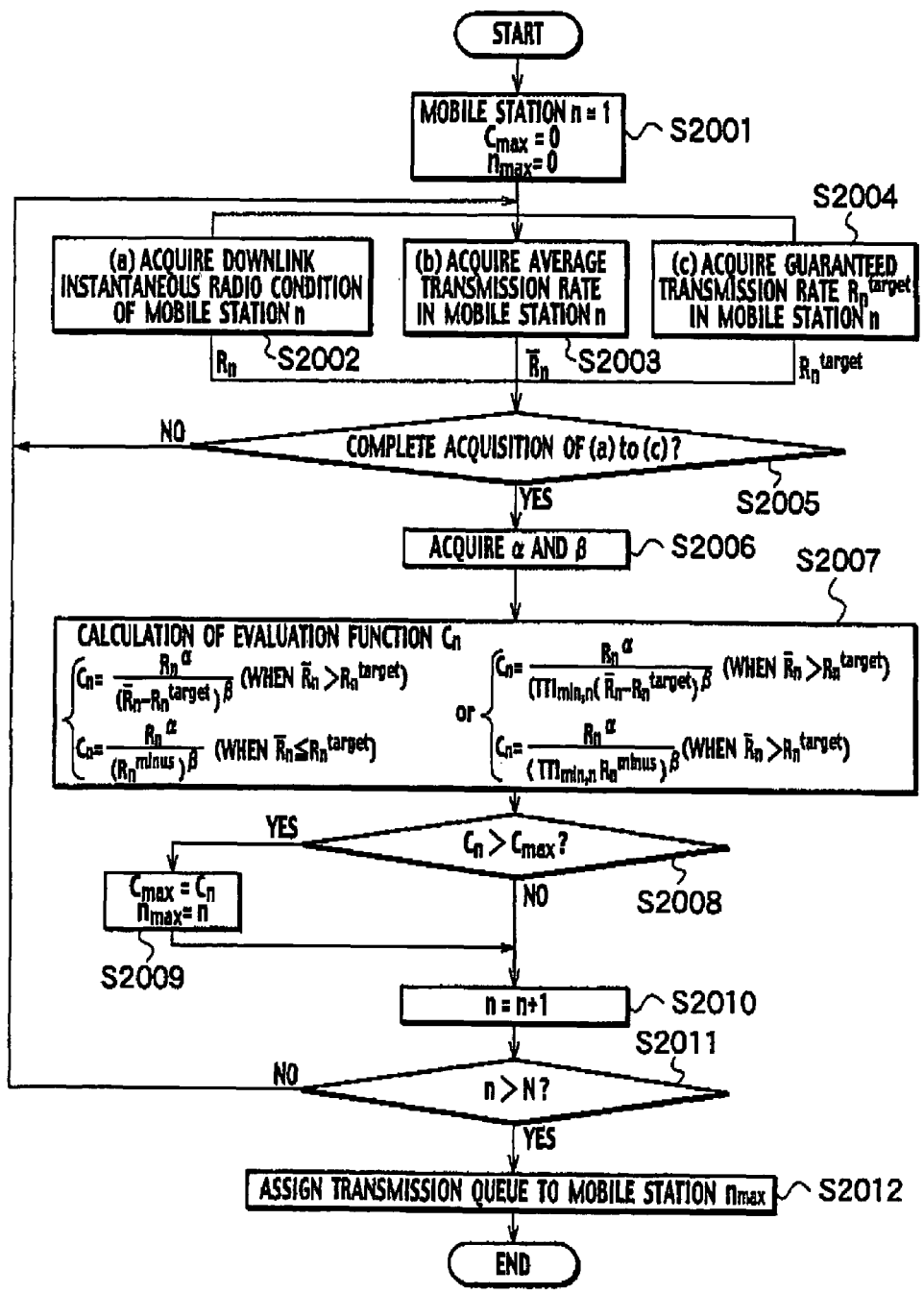
FIG. 8 is a flowchart showing an operation of the MAC-hs processing unit within the base band signal processing unit in the radio bass station according to the first embodiment of the present invention.

Described with reference to FIG. 8 is the operation of the packet transmission control apparatus according to the first embodiment, more specifically, the operation of the scheduling processing for downlink packets in the MAC-hs processing unit 112.

As shown in FIG. 8, in step S2001 the evaluation function calculating unit 180 sets initial values for calculation of the evaluation function related to each mobile station #n.

Specifically, the evaluation function calculating unit 180 sets "n=1", "$C_{max}$0", and "$n_{max}$=0" as the initial values. Here, "n" represents a subscript of the mobile station, "$C_{max}$" represents a maximum value of the evaluation function, and "$n_{max}$" represents a subscript of a mobile station maximizing the value of the evaluation function.

In step S2002, the evaluation function calculating unit 180 acquires an instantaneous radio condition $R_n$ in the downlink between the radio base station and the mobile station #n, or a size (data size) of transmittable packets estimated based upon the radio condition $R_n$, from the layer 1 processing unit 111.

Note that "the size of transmittable packets estimated based upon the radio condition $R_n$" means a size of packets estimated as transmittable packets at a predetermined error rate, based upon CQI indicating downlink quality, an instantaneous SIR of a downlink transmission channel, the radio resources calculated by the MAC-hs resource calculating unit 130 and to be assigned to HS-DSCH, and the like.

In step S2003, the evaluation function calculating unit 180 acquires, from the mobile station transmission rate calculating unit 170, an average transmission rate $$\overline{Rn}$$

of downlink packets to the mobile station #n.

In step S2004, the evaluation function calculating unit 180 acquires, from the guaranteed transmission rate setting unit 160, a guaranteed transmission rate $R_n^{target}$ to be guaranteed for packets within the priority queue (#n) $141_n$ assigned to the mobile station #n.

In addition, when $$\overline{Rn} \leq Rn^{target},$$

the evaluation function calculating unit 180 also acquires a parameter $R_n^{minus}$ which should be set as the denominator of the evaluation function.

In step S2005, the evaluation function calculating unit 180 determines whether all information in the steps S2002 to S2004 is acquired.

Where it is determined that all information is acquired (where the answer is "YES" in the step S2005), this operation proceeds to step S2006. Otherwise (where the answer is "NO" in the step S2005), the evaluation function calculating unit 180 attempts to acquire information which has not been acquired.

In step S2006, the evaluation function calculating unit 180 receives "index parameters α and β", designated remotely, through the call processing unit 105, and then calculates the value $C_n$ of the evaluation function according to any one of (Equation 2a) to (Equation 3a) in step S2007.

$$\begin{cases} Cn = \dfrac{Rn^\alpha}{(\overline{Rn} - Rn^{target})^\beta} & \text{(when } \overline{Rn} > Rn^{target}) \\ Cn = \dfrac{Rn^\alpha}{(Rn^{minus})^\beta} & \text{(when } \overline{Rn} \leq Rn^{target}) \end{cases}$$ (Equation 2a)

(Equation 2b)

$$\begin{cases} Cn = \dfrac{Rn^\alpha}{(TTI_{min,n} \cdot (\overline{Rn} - Rn^{target}))^\beta} & \text{(when } \overline{Rn} > Rn^{target}) \\ Cn = \dfrac{Rn^\alpha}{(Rn^{minus})^\beta} & \text{(when } \overline{Rn} \leq Rn^{target}) \end{cases}$$ (Equation 3a)

(Equation 3b)

Here, "$TTI_{min,n}$" represents the shortest transmission time interval at which the mobile station #n can receive a packet.

Alternatively, the evaluation function calculating unit 180 may be configured to calculate the value $C_n$ of the evaluation function according to the following equations;

$$\begin{cases} Cn = \dfrac{Rn^\alpha}{(\overline{Rn} - Rn^{target})^\beta} & \text{(when } \overline{Rn} - Rn^{target} > Rn^{minus}) \\ Cn = \dfrac{Rn^\alpha}{(Rn^{minus})^\beta} & \text{(when } \overline{Rn} - Rn^{target} \leq Rn^{minus}) \end{cases}$$

or $$\begin{cases} Cn = \dfrac{Rn^\alpha}{(TTI_{min,n} \cdot (\overline{Rn} - Rn^{target}))^\beta} & \text{(when } \overline{Rn} - Rn^{target} > Rn^{minus}) \\ Cn = \dfrac{Rn^\alpha}{(Rn^{minus})^\beta} & \text{(when } \overline{Rn} - Rn^{target} \leq Rn^{minus}) \end{cases}$$

or $$\begin{cases} Cn = \dfrac{Rn^\alpha}{(TTI_{min,n} \cdot (\overline{Rn} - Rn^{target}))^\beta} & \text{(when } \overline{Rn} - Rn^{target} > Rn^{minus}) \\ Cn = \dfrac{Rn^\alpha}{(TTI_{min,n} \cdot Rn^{minus})^\beta} & \text{(when } \overline{Rn} - Rn^{target} \leq Rn^{minus}) \end{cases}$$

The evaluation function calculating unit 180 may also be configured to calculate the value $C_n$ of the evaluation function according to the following equations:

$$\begin{cases} Cn = \dfrac{Rn^\alpha}{(\overline{Rn} - Rn^{target} \cdot TTI_{min,n})^\beta} & \text{(when } \overline{Rn} > Rn^{target} \cdot TTI_{min,n}) \\ Cn = \dfrac{Rn^\alpha}{(Rn^{minus})^\beta} & \text{(when } \overline{Rn} \leq Rn^{target} \cdot TTI_{min,n}) \end{cases}$$

or $$\begin{cases} Cn = \dfrac{Rn^\alpha}{(\overline{Rn} - Rn^{target} \cdot TTI_{min,n})^\beta} & \text{(when } \overline{Rn} - Rn^{target} \cdot TTI_{min,n} > Rn^{minus}) \\ Cn = \dfrac{Rn^\alpha}{(Rn^{minus})^\beta} & \text{(when } \overline{Rn} - Rn^{target} \cdot TTI_{min,n} \leq Rn^{minus}) \end{cases}$$

or $$\begin{cases} Cn = \dfrac{Rn^\alpha}{(\overline{Rn} - Rn^{target} \cdot TTI_{min,n})^\beta} & \text{(when } \overline{Rn} > Rn^{target} \cdot TTI_{min,n}) \\ Cn = \dfrac{Rn^\alpha}{(TTI_{min,n} \cdot Rn^{minus})^\beta} & \text{(when } \overline{Rn} \leq Rn^{target} \cdot TTI_{min,n}) \end{cases}$$

or $$\begin{cases} Cn = \dfrac{Rn^\alpha}{(\overline{Rn} - Rn^{target} \cdot TTI_{min,n})^\beta} & \text{(when } \overline{Rn} - Rn^{target} \cdot TTI_{min,n} > Rn^{minus}) \\ Cn = \dfrac{Rn^\alpha}{(TTI_{min,n} \cdot Rn^{minus})^\beta} & \text{(when } \overline{Rn} - Rn^{target} \cdot TTI_{min,n} \leq Rn^{minus}) \end{cases}$$

As shown in, for example, Table 5.1a in the literature (3GPP TS25.306 v5.2.0 UE Radio Access Capabilities), $TTI_{min,n}$ is expected to be a value of "2" or "3", in order to reduce burdens on the mobile station #n in processing received signals.

Where the HARQ unit performs repeated processing of transmitting ACK/NACK in the uplink transmission channels, $TTI_{min,n}$ is also expected to be the value of "2" or "3", in order to reduce the error rate of ACK/NACK by HARQ.

Description is provided below regarding an operational effect where the evaluation function calculating unit 180 calculates the value $C_n$ of the evaluation function according to (Equation 2a) and (Equation 2b).

In this embodiment, "$R_n^{target}$" in the denominator on the right hand side of (Equation 2a) and "$R_n^{minus}$" in the denominator on the right hand side of (Equation 2b) are designated remotely, for example, by a host node of the radio base station 100 (e.g., the radio network controller and a server on a core network).

For example, "$R_n^{target}$" and "$R_n^{minus}$" are contained in a call processing control signal, and notified to the radio base station 100 from the host node.

The call processing unit 105 of the radio base station 100 receives "$R_n^{target}$" and "$R_n^{minus}$" contained in the above call processing control signal, and then transfers them to the evaluation function calculating unit 180 of the MAC-hs processing unit 112 within the base band signal processing unit 104.

The evaluation function calculating unit 180 substitutes the transferred "$R_n^{target}$" and "$R_n^{minus}$" into (Equation 2a) or (Equation 2b), and calculates the value $C_n$ of the evaluation function.

For example, in providing a streaming service, the guaranteed transmission rate setting unit 160 sets the guaranteed transmission rate "$R_n^{target}$" at "128 (a value corresponding to 64 kbps: a value obtained by conversion into a transmission block size per 1 TTI)".

Here, it is assumed that the radio quality of the mobile station #n, the average transmission rate of packets to which is "300", is degraded due to a change in a propagation environment, so that the average transmission rate of packets to the mobile station #n is gradually reduced.

In this case, the closer the average transmission rate of packets to the mobile station #n to "128", the smaller the value of the denominator of the evaluation function becomes.

As a result, the value $C_n$ of the evaluation function increases, thus increasing opportunities of assignment of a transmission queue to the mobile station #n. Consequently, the average transmission rate of packets to the mobile station #n increases.

As described above, the closer the average transmission rate of packets to the mobile station #n to the guaranteed transmission rate $R_n^{target}$, the greater the value $C_n$ of the evaluation function becomes. Hence, the average transmission rate of packets to the mobile station #n is maintained higher than the guaranteed transmission rate $R_n^{target}$, thus guaranteeing the minimum transmission rate of packets to the mobile station #n.

In this embodiment, although the desired minimum transmission rate to be actually guaranteed is "64 kbps", the guaranteed transmission rate setting unit 160 may set the guaranteed transmission rate $R_n^{target}$ not at "128" but at a value greater than "128" (for example, "150").

In this case, the closer the average transmission rate of packets to the mobile station #n to "150", the smaller the value of the denominator of the evaluation function becomes.

As a result, the value $C_n$ of the evaluation function increases, thus increasing opportunities of assignment of a transmission queue to the mobile station #n. Consequently, the minimum transmission rate can be guaranteed with additional reliability in comparison with the case where the guaranteed transmission rate $R_n^{target}$ is set at "128".

On the other hand, although the desired minimum transmission rate to be actually guaranteed is "64 kbps", the guaranteed transmission rate setting unit 160 may set the guaranteed transmission rate $R_n^{target}$ not at "128" but at a value smaller than "128" (for example, "100").

In this case, the closer the average transmission rate of packets to the mobile station #n to "100", the smaller the value of the denominator of the evaluation function becomes.

As a result, the value $C_n$ of the evaluation function increases, thus increasing opportunities of assignment of a transmission queue to the mobile station #n.

Consequently, although the minimum transmission rate is not as highly guaranteed, the minimum transmission rate can be guaranteed appropriately in comparison with the conventional "Proportional Fairness Scheduler (where the guaranteed transmission rate is "0")".

In such a case, the conventional "Proportional Fairness Scheduling" becomes more effective as the guaranteed transmission rate is not strictly guaranteed, and thereby the entire throughput improves.

In short, the guarantee level of the minimum transmission rate to be provided can be controlled in a manner that the guaranteed transmission rate setting unit 160 sets the guaranteed transmission rate $R_n^{target}$ at a value greater or smaller than the minimum transmission rate to be actually guaranteed.

Meanwhile, where the average transmission rate of packets to the mobile station #n is lower than the guaranteed transmission rate $R_n^{target}$, the value $C_n$ of the evaluation function is obtained according to (Equation 2b).

Here, an appropriate value is set as $R_n^{minus}$. For example, $R_n^{minus}$ is set for each priority class, each service type, each terminal type, each cell type, or each contract type.

For example, where the minimum transmission rate should be strictly guaranteed in a service like a VoIP service, "$10^{-10}$" is set as $R_n^{minus}$.

In such a case, the value $C_n$ of the evaluation function greatly increases, and the probability of assignment of a transmission queue to the mobile station #n dramatically increases until the average transmission rate of packets to the mobile station #n becomes higher than the guaranteed transmission rate $R_n^{target}$. Thus, the minimum transmission rate can be strictly guaranteed.

Moreover, for example, where a contract type requires that the minimum transmission rate be ensured not so strictly but at a predetermined rate, the $R_n^{target}$ is set at "1".

In such a case, the value $C_n$ of the evaluation function increases to some extent, and the probability of assignment of a transmission queue to the mobile station #n can be increased to some extent. In other words, the guarantee level of the minimum transmission rate to be provided can be controlled by controlling $R_n^{minus}$.

Where the average transmission rate of packets to the mobile station #n is lower than the guaranteed transmission rate $R_n^{target}$, it is possible to determine that a communication which ensures the minimum transmission rate between the radio base station and the mobile station #n cannot be established, and then terminate the communication with the mobile station #n.

In this case, it is no longer required to assign the radio resources to a mobile station whose communication quality is so low that it cannot guarantee the minimum transmission rate. Therefore, the throughput of the entire cell improves. As a result, the evaluation function calculating unit 180 does not need to use (Equation 2b) and (Equation 3b) in calculating the value $C_n$ of the evaluation function.

In this embodiment, by setting the index parameters $\alpha$ and $\beta$ appropriately, it becomes possible to provide the "Proportional Fairness Scheduler ($\alpha=1$, $\beta=1$)" which can guarantee the minimum transmission rate, the "MAX C/I Scheduler ($\alpha=1$, $\beta\sim 0$ (where $\beta\neq 0$))" which can guarantee the minimum transmission rate, and a scheduler which has an intermediate characteristic of the "Proportional Fairness Scheduler" and the "MAX C/I Scheduler" and can also guarantee the minimum transmission rate.

The present invention is not limited to the foregoing aspects, and can be applied to a scheduler in which a part of the equation to obtain the value $C_n$ of the evaluation function is $$\frac{Rn^\alpha}{Rn^\beta}.$$

For example, in a scheduler in which the equation to calculate the value $C_n$ of the evaluation function is $$Cn = \frac{Rn^\alpha}{Rn^\beta} \cdot W_n^r,$$

a function of ensuring the guaranteed transmission rate can be added to the function of the conventional scheduler, by using the equation $$Cn = \frac{Rn^\alpha}{Rn - Rn^{target}} \cdot W_n^r$$

to calculate the value $C_n$ of the evaluation function.

Here, "$\alpha$", "$\beta$", and "$\gamma$" represent parameters set at values ranging from "0" to "1", and "$W_n$" represents a buffering time of packets to the mobile station #n in the radio base station 100.

Once the value $C_n$ of the evaluation function is calculated as described above, the evaluation function calculating unit 180 determines whether the calculated value $C_n$ of the evaluation function is the maximum value in step S2008.

Currently, "$C_{max}=0$ (the initial value)". Thus, in step S2009, the evaluation function calculating unit 180 sets the value $C_n$ of the evaluation function, measured in the step S2007, as $C_{max}$, and sets the subscript "n" of the mobile station #n corresponding to $C_{max}$, as $n_{max}$.

In step S2010, the evaluation function calculating unit 180 increments the value of "n" by "+1" in order to calculate the value $C_{n+1}$ of the evaluation function of the next mobile station #n+1.

In step S2011, the evaluation function calculating unit 180 determines whether the value of "n" exceeds the number "N" of the mobile stations which are communicating with the radio base station 100.

Where it is determined in the step S2011 that the value of "n" does not exceed the number "N" of the mobile stations (where the answer is "NO" in the step S2011), the loop processing from the steps S2002 to S2010 is repeatedly carried out in this operation until it is determined that the value of "n" exceeds the number "N" of the mobile stations.

As a result, the evaluation function calculating unit 180 can calculate the values $C_n$ of the evaluation function with respect to all the mobile stations communicating with the radio mobile station 100.

On the other hand, where it is determined in the step 2011 that the value of "n" exceed the number "N" of the mobile stations (where the answer is "YES" in the step S2011), the evaluation function calculating unit 180 instructs the scheduling unit 140 to assign a transmission queue to the mobile station #$n_{max}$ which corresponds to $n_{max}$ set in the step S2009.

<Operational Effect of Packet Transmission Control Apparatus According to the Present Embodiment>

In the packet transmission control apparatus according to the first embodiment, a minimum transmission rate to be actually guaranteed is set as the "guaranteed transmission rate $R_n^{target}$, thus providing a scheduler which can guarantee the minimum transmission rate.

Further, in the packet transmission control apparatus according to the first embodiment, the guarantee level of the minimum transmission rate can be controlled by setting the "guaranteed transmission rate $R_n^{target}$ at a value greater or smaller than the minimum transmission rate to be actually guaranteed.

Furthermore, in the packet transmission control apparatus according to the first embodiment, (Equation 3a) and (Equation 3b) are used as equations for calculating the value $C_n$ of the evaluation function. Thus, it is possible to eliminate an influence of deterioration of the transmission rate of packets, from calculation of scheduling. Here, the transmission rate is deteriorated because a minimum transmission time interval, at which packets can be received in the mobile station #n, is long.

In the first embodiment, one mobile station uses one priority queue. However, one mobile station can also use a plurality of priority queues (for example, the K priority queues). In such a case, the packet transmission control apparatus according to the first embodiment performs scheduling processing for the N×K priority queues, instead of N priority queues.

The evaluation function calculating unit 180 of the MAC-hs processing unit 112 includes, for example, a CPU and a digital signal processor (DSP), or a programmable device such as EPGA which can rewrite programs.

The evaluation function calculating unit 180 may be configured to store a program for calculating the value $C_n$ of the evaluation function, in a predetermined memory area, then download and rewrite predetermined parameters ($\alpha$, $\beta$, $\gamma$, $R_n^{target}$, and $R_n^{minus}$).

Here, the evaluation function calculating unit 180 may be configured to download the predetermined parameters ($\alpha$, $\beta$, $\gamma$, $R_n^{target}$, and $R_n^{minus}$) from the host node of the radio base station 100, or to include a terminal I/F (an external interface function) and read the predetermined parameters ($\alpha$, $\beta$, $\gamma$, $R_n^{target}$, and $R_n^{minus}$) directly from a terminal.

Further, each function block of the aforementioned MAC-hs processing unit 112 may be divided by hardware or divided as software by programs on a processor.

<Packet Transmission Control Apparatus According to the Second Embodiment of the Present Invention>

A packet transmission control apparatus according to the second embodiment of the present invention is described focusing on different points from the packet transmission control apparatus according to the aforementioned first embodiment.

As proposed in, for example, Japanese Patent Laid-Open Publication No. H3-58646, in packet transmission in a packet communication network, it is generally considered that two kinds of priority classes are provided and packets with the first priority are transmitted preferentially over packets with the second priority.

In the second embodiment, the scheduling unit 140 is configured to manage priority classes $PC_n$ related to transmission of packets, for each mobile station #n, and to perform scheduling of packets in accordance with the priority classes $PC_n$.

An operation of the packet transmission control apparatus according to the second embodiment is described below with reference to FIG. 9.

Figure 9:
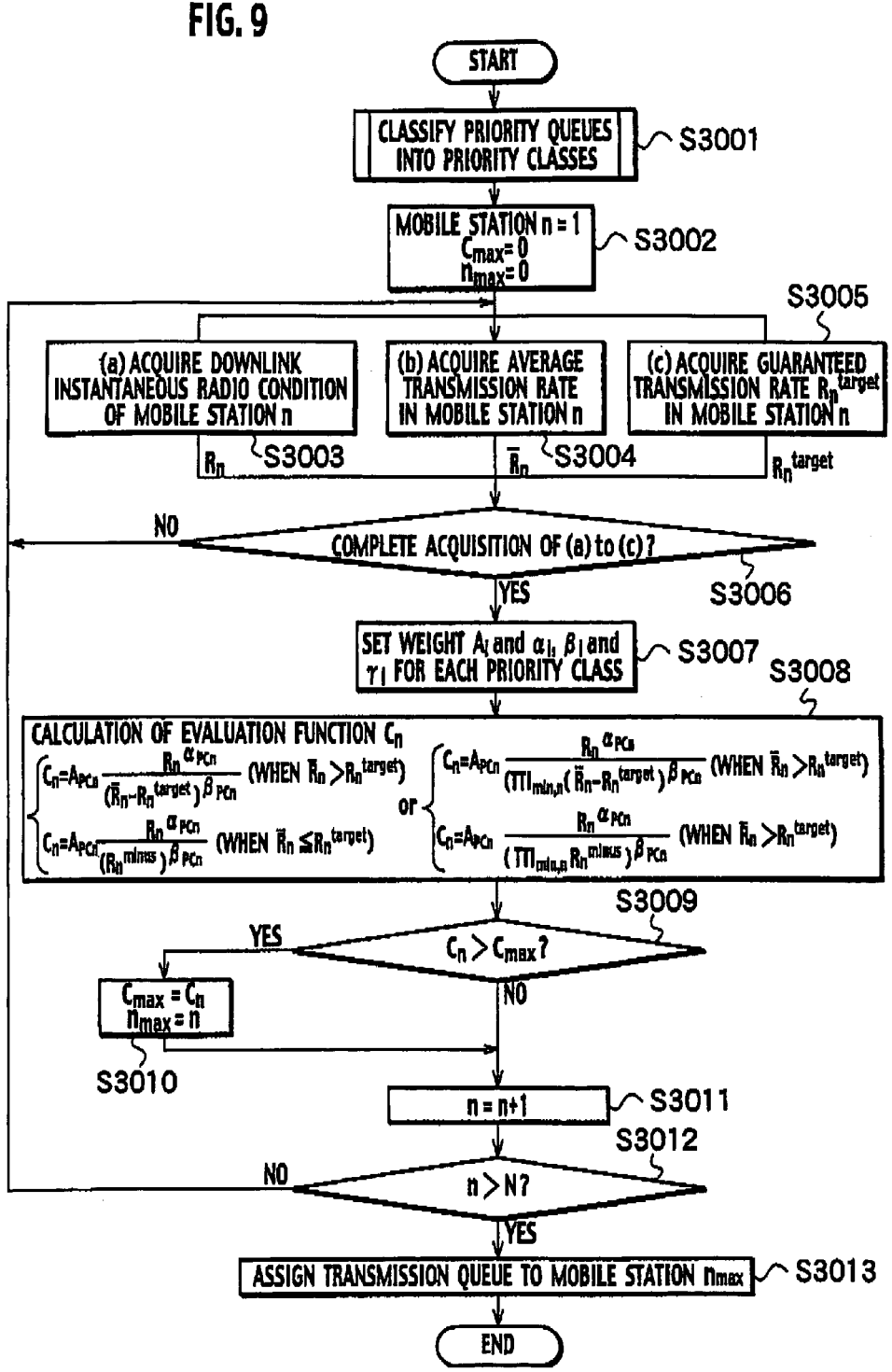
FIG. 9 is a flowchart showing an operation of an MAC-hs processing unit within a base band signal processing unit in a radio base station according to a second embodiment of the present invention

As shown in FIG. 9, in step S3001, the evaluation function calculating unit 180 of the MAC-hs processing unit 112 classifies the priority queues (#1 to #N) $141_1$ to $141_N$ into several priority classes.

The operations from steps S3002 to S3006 is the same as those of the steps S2001 to S2005 shown in FIG. 8.

In step S3006, the evaluation function calculating unit 180 acquires all of $$Rn, \overline{Rn}, Rn^{target}, Rn^{minus}$$

required in calculating the value $C_n$ of the evaluation function of the mobile station #n.

Thereafter, in step S3007, the evaluation function calculating unit 180 receives predetermined parameters ($\alpha_i$, $\beta_i$, and $\delta_i$), designated remotely, through the call processing unit 105, and a weighting factor (weight) $A_i$ (where "i" represents a subscript of the priority class of the mobile station #n) set for each priority class.

In step 3008, the evaluation function calculating unit 180 calculates the value $C_n$ of the evaluation function based upon any one of (Equation 4a) to (Equation 6b).

$$\begin{cases} Cn = A_{pcn} \dfrac{Rn^{\alpha pcn}}{(\overline{Rn} - Rn^{target})^{\beta pcn}} & \text{(when } \overline{Rn} > Rn^{target}) \quad \text{(Equation 4a)} \\ Cn = A_{pcn} \dfrac{Rn^{\alpha pcn}}{(Rn^{minus})^{\beta pcn}} & \text{(when } \overline{Rn} \leq Rn^{target}) \quad \text{(Equation 4b)} \end{cases}$$

-continued $$\begin{cases} Cn = A_{pcn} \dfrac{Rn^{\alpha pcn}}{(TTI_{\min,n} \cdot (\overline{Rn} - Rn^{target}))^{\beta pcn}} & \text{(when } \overline{Rn} > Rn^{target}) \\ Cn = A_{pcn} \dfrac{Rn^{\alpha pcn}}{(Rn^{minus})^{\beta pcn}} & \text{(when } \overline{Rn} \le Rn^{target}) \end{cases}$$ (Equation 5a)
(Equation 5b)

or $$\begin{cases} Cn = A_{pcn} \dfrac{Rn^{\alpha pcn}}{(TTI_{\min,n} \cdot (\overline{Rn} - Rn^{target}))^{\beta pcn}} & \text{(when } \overline{Rn} > Rn^{target}) \\ Cn = A_{pcn} \dfrac{Rn^{\alpha pcn}}{(TTI_{\min,n} \cdot Rn^{minus})^{\beta pcn}} & \text{(when } \overline{Rn} \le Rn^{target}) \end{cases}$$ (Equation 6a)
(Equation 6b)

Here, "$PC_n$" represents the priority class of the mobile station #n.

The evaluation function calculating unit 180 may also be configured to calculate the value $C_n$ of the evaluation function according to the following equation;

$$\begin{cases} Cn = A_{pcn} \dfrac{Rn^{\alpha pcn}}{(\overline{Rn} - Rn^{target})^{\beta pcn}} & \text{(when } \overline{Rn} - Rn^{target} > Rn^{minus}) \\ Cn = A_{pcn} \dfrac{Rn^{\alpha pcn}}{(Rn^{minus})^{\beta pcn}} & \text{(when } \overline{Rn} - Rn^{target} \le Rn^{minus}) \end{cases}$$

or $$\begin{cases} Cn = A_{pcn} \dfrac{Rn^{\alpha pcn}}{(TTI_{\min,n} \cdot (\overline{Rn} - Rn^{target}))^{\beta pcn}} & \text{(when } \overline{Rn} - Rn^{target} > Rn^{minus}) \\ Cn = A_{pcn} \dfrac{Rn^{\alpha pcn}}{(Rn^{minus})^{\beta pcn}} & \text{(when } \overline{Rn} - Rn^{target} \le Rn^{minus}) \end{cases}$$

or $$\begin{cases} Cn = A_{pcn} \dfrac{Rn^{\alpha pcn}}{(TTI_{\min,n} \cdot (\overline{Rn} - Rn^{target}))^{\beta pcn}} & \text{(when } \overline{Rn} - Rn^{target} > Rn^{minus}) \\ Cn = A_{pcn} \dfrac{Rn^{\alpha pcn}}{(TTI_{\min,n} \cdot Rn^{minus})^{\beta pcn}} & \text{(when } \overline{Rn} - Rn^{target} \le Rn^{minus}) \end{cases}$$

Alternatively, the evaluation function calculating unit 180 may be configured to calculate the value $C_n$ of the evaluation function according to the following equation:

$$\begin{cases} Cn = A_{pcn} \dfrac{Rn^{\alpha pcn}}{(\overline{Rn} - Rn^{minus} \cdot TTI_{\min,n})^{\beta pcn}} & \text{(when } \overline{Rn} > Rn^{target} \cdot TTI_{\min,n}) \\ Cn = A_{pcn} \dfrac{Rn^{\alpha pcn}}{(Rn^{minus})^{\beta pcn}} & \text{(when } \overline{Rn} \le Rn^{target} \cdot TTI_{\min,n}) \end{cases}$$

or $$\begin{cases} Cn = A_{pcn} \dfrac{Rn^{\alpha pcn}}{(\overline{Rn} - Rn^{minus} \cdot TTI_{\min,n})^{\beta pcn}} & \text{(when } \overline{Rn} - Rn^{target} \cdot TTI_{\min,n} > Rn^{minus}) \\ Cn = A_{pcn} \dfrac{Rn^{\alpha pcn}}{(Rn^{minus})^{\beta pcn}} & \text{(when } \overline{Rn} - Rn^{target} \cdot TTI_{\min,n} \le Rn^{minus}) \end{cases}$$

or $$\begin{cases} Cn = A_{pcn} \dfrac{Rn^{\alpha pcn}}{(\overline{Rn} - Rn^{target} \cdot TTI_{\min,n})^{\beta pcn}} & \text{(when } \overline{Rn} > Rn^{target} \cdot TTI_{\min,n}) \\ Cn = A_{pcn} \dfrac{Rn^{\alpha pcn}}{(TTI_{\min,n} \cdot Rn^{minus})^{\beta pcn}} & \text{(when } \overline{Rn} \le Rn^{target} \cdot TTI_{\min,n}) \end{cases}$$

or $$\begin{cases} Cn = A_{pcn} \dfrac{Rn^{\alpha pcn}}{(\overline{Rn} - Rn^{target} \cdot TTI_{\min,n})^{\beta pcn}} & \text{(when } \overline{Rn} - Rn^{target} \cdot TTI_{\min,n} > Rn^{minus}) \\ Cn = A_{pcn} \dfrac{Rn^{\alpha pcn}}{(TTI_{\min,n} \cdot Rn^{minus})^{\beta pcn}} & \text{(when } \overline{Rn} - Rn^{target} \cdot TTI_{\min,n} \le Rn^{minus}) \end{cases}$$

For example, in (Equation 4a) to (Equation 5b), two priority classes PCn are provided. The higher priority class $PC_n$ is set as "1" ($PC_n=1$), and the lower priority class $PC_n$ is set as "2" ($PC_n=2$). In this case, by setting them so that "A1>A2", packets to the mobile station #n with the higher priority class are transmitted preferentially. In other words, by causing a difference between A1 and A2 to be sufficiently large, the packets with the higher priority class are always transmitted preferentially.

Further, by setting the index parameters "($\alpha1$, $\beta2$)=(1, 1)" and "($\alpha2$, $\beta2$)=(1,0)", the packet transmission control apparatus according to the second embodiment can operate as the "Proportional Fairness Scheduler" for packets with the higher priority class and as the "MAX C/I Scheduler" for packets with the lower priority class.

Moreover, by setting the index parameters "($\delta1$, $\delta2$)= (0.9999, 0.99)", the packet transmission control apparatus according to the second embodiment can control the priority classes as follows: a large averaging section is set for packets with the higher priority class with more consideration of fairness in terms of time; a small averaging section is set for packets with the lower priority class with less consideration of fairness in terms of time.

In addition to the abovementioned control of the priority classes, the packet transmission control apparatus according to the second embodiment can set a guaranteed transmission rate for each priority class.

Specifically, the guaranteed transmission rate $R_n^{target}$ for the mobile station #n having the higher priority class ($PC_n=1$) is set at "256", and the guaranteed transmission rate $R_n^{target}$ for the mobile station #n having the lower priority class ($PC_n=2$) is set at "64".

In this case, a higher transmission rate is guaranteed for packets addressed to the mobile station #n having the higher priority class, and a lower transmission rate is guaranteed for packets addressed to the mobile station #n having the lower priority class.

In other words, by setting a guaranteed transmission rate for each priority class, a minimum transmission rate depending on the priority classes can be guaranteed.

Once the value $C_n$ of the evaluation function is calculated as described above, the evaluation function calculating unit 180 determines whether the calculated value $C_n$ of the evaluation function is a maximum value in step S3009.

Currently, "$C_{max}=0$ (the initial value)". Thus, in step S3010, the evaluation function calculating unit 180 sets the value $C_n$ of the evaluation function, measured in the step S3008, as $C_{max}$, and sets the subscript "n" of the mobile station #n corresponding to $C_{max}$, as $n_{max}$.

In step S3011, the evaluation function calculating unit 180 increments the value of "n" by "+1", in order to calculate the value $C_{+1}$ of the evaluation function of the next mobile station #n+1.

In step S3012, the evaluation function calculating unit 180 determines whether the value of "n" exceeds the number "N" of the mobile stations communicating with the radio base station 100.

Where it is determined that the value of "n" does not exceed the number "N" of the mobile stations in the step S3012 (where the answer is "NO" in the step S3012), loop processing from the steps S3003 to S3011 is repeatedly carried out in this operation until it is determined that the value of "n" exceeds the number "N" of the mobile stations.

As a result, the evaluation function calculating unit 180 can calculate the values $C_n$ of the evaluation function of all mobile stations communicating with the radio base station 100.

Meanwhile, where it is determined that the value of "n" exceeds the number "N" of the mobile stations (where the answer is "YES" in the step S3012), the evaluation function calculating unit 180 instructs the scheduling unit 140 to assign a transmission queue to the mobile station #$n_{max}$ which corresponds to $n_{max}$ set in the step 3010.

The packet transmission control apparatus according to the second embodiment not only controls the weighting factor $A_i$ and index parameters $\alpha_i$, $\beta_i$, and $\delta_i$ in accordance with the priority classes, but also sets the guaranteed transmission rate $R_n^{target}$ for each priority class. Thus, the packet transmission control apparatus can realize an appropriate scheduler in accordance with the priority classes while guaranteeing minimum transmission rate depending on the priority classes.

In the second embodiment, the parameters and guaranteed transmission rate of the scheduler are changed in accordance with the priority classes. However, the present invention is not limited to this.

For example, the packet transmission control apparatus according to the present invention defines service types (service classes) so that the parameters of a scheduler and the guaranteed transmission rate are set in accordance with service types, thus realizing an appropriate scheduler.

Here, the service types classify services for transferring packets with various data sizes, and include, for example, an image packet transfer service and a voice packet transfer service.

Moreover, the packet transmission control apparatus according to the present invention defines contract types so that the parameters of a scheduler and the guaranteed transmission rate are set in accordance with the contract types, thus realizing an appropriate scheduler.

Here, the contract types classify various tariff contracts, and include, for example, a low class contract and a high class contract.

Furthermore, the packet transmission control apparatus according to the present invention defines cell types so that the parameters of a scheduler and the guaranteed transmission rate are set in accordance with the cell types, thus realizing an appropriate scheduler.

Here, the cell types classify the forms of cells, and include, for example, an indoor or outdoor cell, a cell in a suburban or urban district, or a cell in a high-traffic region or low-traffic region.

Moreover, the packet transmission control apparatus according to the present invention defines terminal types so that the parameters of a scheduler and the guaranteed transmission rate are set in accordance with the terminal types, thus realizing an appropriate scheduler.

Here, the terminal types classify various terminals, and include, for example, a class based upon identification of a mobile station, types depending on presence/absence or types of a RAKE receiving function, an equalizer, a receive diversity, an interference canceller and the like, and types depending on terminal capabilities such as a receivable modulation scheme, a code number, and the number of bits.

<Packet Transmission Control Apparatus According to the Third Embodiment of the Present Invention>

A packet transmission control apparatus according to the third embodiment of the present invention is described, focusing on a different point from the packet transmission control apparatus according to the foregoing first and second embodiments.

In this embodiment, the guaranteed transmission rate setting unit 160 is configured to set the guaranteed transmission rate $R_n^{target}$ at a negative value.

In such a case, in compared with the evaluation function $$Cn = \frac{Rn^\alpha}{\overline{Rn}^\beta}$$

in conventional "Proportional Fairness Scheduler", the evaluation function $$Cn = \frac{Rn^\alpha}{(\overline{Rn} + |Rn^{target}|)^\beta}$$

used in the packet transmission control apparatus according to the third embodiment has a smaller influence of the denominator, thus reducing the level of fairness to be provided.

In other words, the conventional scheduler controls fairness by adjusting the values of the predetermined parameters α, β, and δ. However, the packet transmission control apparatus according to the third embodiment can control fairness to be prevented, by adjusting the magnitude of $|R_n^{target}|$.

Description of the embodiments so far was about the HSDPA which is a high-speed packet transmission system in 3GPP. However, the present invention is not limited to the HSDPA, and can be applied to an arbitrary high-speed packet transmission system which performs transmission control (scheduling) of downlink packets in a mobile communication system.

For example, the present invention can be applied to a high-speed packet transmission system such as the high-speed packet transmission systems in the "cdma2000", the "1x-EV DO", the "TDD" in 3GPP2, and the like.

As described so far, according to the present invention, it is possible to provide a packet transmission control apparatus and a packet transmission control method which can provide a guaranteed transmission rate while performing a conventional scheduling algorithm.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A packet transmission control apparatus which performs transmission control of packets to a plurality of mobile stations, comprising:
an acquirer configured to acquire an average transmission rate of packets to each of the plurality of mobile stations and a guaranteed transmission rate of the packets; and
a scheduler configured to perform scheduling to transmit packets to a specific mobile station preferentially, when an average transmission rate of the packets to the specific mobile station approaches the guaranteed transmission rate, wherein
the acquirer is configured to acquire the average transmission rate $\overline{Rn}$ of the packets to the mobile station #n, the guaranteed transmission rate $R_n^{target}$, a radio condition $R_n$ between the packet transmission control apparatus and the mobile station #n, and predetermined parameters α and β, and the scheduler is configured to select a mobile station #n to which packets are transmitted based upon a relationship between $Rn^\alpha$ and $(\overline{Rn}-Rn^{target})^\beta$, wherein α and β are within a range $0 \leq \alpha, \beta \leq 1$.

2. The packet transmission control apparatus according to claim 1, wherein the scheduler is configured to perform the scheduling to transmit the packets preferentially to a mobile station #n maximizing a value $C_n$ of an evaluation function calculated according to an equation $$Cn = \frac{Rn^\alpha}{(\overline{Rn} - Rn^{target})^\beta}.$$

3. The packet transmission control apparatus according to claim 1, wherein the scheduler is configured to perform the scheduling to transmit the packets preferentially to a mobile station #n maximizing a value $C_n$ of an evaluation function calculated according to an equation $$Cn = \frac{Rn^\alpha}{(TTI_{min,n} \cdot (\overline{Rn} - Rn^{target}))^\beta},$$

by using a minimum transmission time interval $TTI_{min,n}$ at which the mobile station #n can receive the packets.

4. The packet transmission control apparatus according to claim 1, wherein the acquirer is configured to set the guaranteed transmission rate for each service type, each contract type, each terminal type, each cell type, or each priority class.

5. The packet transmission control apparatus according to claim 1, wherein the acquirer is configured to set the guaranteed transmission rate so that the guaranteed transmission rate is higher than a minimum transmission rate to be guaranteed.

6. The packet transmission control apparatus according to claim 1, wherein the acquirer is configured to set the guaranteed transmission rate so that the guaranteed transmission rate is lower than a minimum transmission rate to be guaranteed.

7. The packet transmission control apparatus according to claim 1, wherein the acquirer is configured to calculate the average transmission rate $\overline{Rn}(t)$ of the packets to the mobile station #n according to an equation $\overline{Rn}(t) = \delta \cdot \overline{Rn}(t-1) + (1-\delta) \cdot r_n$, by using an instantaneous transmission rate $r_n$ of packets to the mobile station #n and a predetermined parameter δ, wherein δ is within a range $0 \leq \delta \leq 1$.

8. The packet transmission control apparatus according to claim 7, wherein the instantaneous transmission rate $r_n$ is any one of a size of a packet, delivery acknowledgement of which has been received from the mobile station #n, a size of a packet transmitted to the mobile station #n, and a size of a transmittable packet calculated based upon a radio condition $R_n$ between the packet transmission control apparatus and the mobile station #n.

9. The packet transmission control apparatus according to claim 7, wherein the acquirer is configured to renew the average transmission rate $\overline{Rn}$, at each predetermined transmission time interval, or at each time interval in which a value of an evaluation function used for the scheduling of the packets is calculated.

10. The packet transmission control apparatus according to claim 1, wherein the acquirer is configured to set the guaranteed transmission rate at a negative value.

11. A packet transmission control apparatus which performs transmission control of packets to a plurality of mobile stations, comprising:

an acquirer configured to acquire an average transmission rate of packets to each of the plurality of mobile stations and a guaranteed transmission rate of the packets; and a scheduler configured to perform scheduling to transmit packets to a specific mobile station preferentially, when an average transmission rate of the packets to the specific mobile station approaches the guaranteed transmission rate, wherein the acquirer is configured to acquire the average transmission rate $\overline{Rn}$ of the packets to the mobile station #n, the guaranteed transmission rate $R_n^{target}$, a radio condition $R_n$ between the packet transmission control apparatus and the mobile station #n, and predetermined parameters $\alpha$, $\beta$, and $R_n^{minus}$, and the scheduler is configured to select a mobile station #n to which the packets are preferentially transmitted based upon a relationship amongst $Rn^\alpha$, $(\overline{Rn}-Rn^{target})^\beta$ and $(Rn^{minus})^\beta$, wherein $\alpha$ and $\beta$ are within a range $0 \leq \alpha, \beta \leq 1$.

12. The Packet transmission control apparatus according to claim 11, wherein the scheduler is configured to perform the scheduling to transmit the packets preferentially to a mobile station #n maximizing a value $C_n$ of an evaluation function calculated according to equations $$Cn = \frac{Rn^\alpha}{(\overline{Rn} - Rn^{target})^\beta} \quad (\text{when } \overline{Rn} > Rn^{target}),$$

$$Cn = \frac{Rn^\alpha}{(Rn^{minus})^\beta} \quad (\text{when } \overline{Rn} \leq Rn^{target}).$$

13. The packet transmission control apparatus according to claim 11, wherein the scheduler is configured to perform the scheduling to transmit the packets preferentially to a mobile station #n maximizing a value $C_n$ of an evaluation function calculated according to equations $$Cn = \frac{Rn^\alpha}{(TTI_{\min,n} \cdot (\overline{Rn} - Rn^{target}))^\beta} \quad (\text{when } \overline{Rn} > Rn^{target}),$$

$$Cn = \frac{Rn^\alpha}{(Rn^{minus})^\beta} \quad (\text{when } \overline{RN} \leq Rn^{target}).$$

14. A packet transmission control apparatus which performs transmission control of packets to a plurality of mobile stations, comprising:

an acquirer configured to acquire an average transmission rate of packets to each of the plurality of mobile stations and a guaranteed transmission rate of the packets; and a scheduler configured to perform scheduling to transmit packets to a specific mobile station preferentially, when an average transmission rate of the packets to the specific mobile station approaches the guaranteed transmission rate, wherein the scheduler is configured to manage a priority class $PC_n$ for each of the mobile stations #n, the priority class $PC_n$ being related to transmission of the packet, and the acquirer is configured to acquire the average transmission rate $\overline{Rn}$ of the packets to the mobile station #n, the guaranteed transmission rate $R_n^{target}$, a radio condition $R_n$ between the packet transmission control apparatus and the mobile station #n, and predetermined parameters $\alpha_{PCn}$ and $\beta_{PCn}$ in accordance with the priority classes $PC_n$, and to select a mobile station #n to which the packets are transmitted preferentially based upon a relationship between $Rn^{\alpha pcn}$ and $(\overline{Rn}-Rn^{target})^{\beta pcn}$, wherein $\alpha_{PCn}$ and $\beta_{PCn}$ are within a range $0 \leq \alpha_{PCn}, \beta_{PCn} \leq 1$.

15. The packet transmission control apparatus according to claim 14, wherein the acquirer is configured to further acquire a weighting factor $A_{PCn}$ in accordance with the priority class $PC_n$, and the scheduler is configured to perform the scheduling to transmit the packets preferentially to a mobile station #n maximizing a value $C_n$ of an evaluation function calculated according to an equation $$Cn = Apcn \frac{Rn^{\alpha pcn}}{(\overline{Rn} - Rn^{target})^{\beta pcn}}.$$

16. The packet transmission control apparatus according to claim 14, wherein the acquirer is configured to further acquire a weighting factor $A_{PCn}$ in accordance with the priority class $PC_n$, and the scheduler is configured to perform the scheduling to transmit the packets preferentially to a mobile station #n maximizing a value $C_n$ of an evaluation function calculated according to an equation $$Cn = Apcn \frac{Rn^{\alpha pcn}}{(TTI_{\min,n} \cdot (\overline{Rn} - Rn^{target}))^{\beta pcn}},$$

by using a minimum transmission time interval $TTI_{mim,n}$ at which the mobile station #n can receive the packet.

17. A packet transmission control apparatus which performs transmission control of packets to a plurality of mobile stations, comprising:

an acquirer configured to acquire an average transmission rate of packets to each of the plurality of mobile stations and a guaranteed transmission rate of the packets; and a scheduler configured to perform scheduling to transmit packets to a specific mobile station preferentially, when an average transmission rate of the packets to the specific mobile station approaches the guaranteed transmission rate, wherein the scheduler is configured to manage a priority class $PC_n$ for each of the mobile stations #n, the priority class $PC_n$ being related to transmission of the packets, the acquirer is configured to acquire the average transmission rate $\overline{Rn}$ of the packets to the mobile station #n, the guaranteed transmission rate $R_n^{target}$, a radio condition $R_n$ between the packet transmission control apparatus and the mobile station #n, a predetermined parameter $R_n^{minus}$ related to the mobile station #n, and predetermined parameters $\alpha_{PCn}$ and $\beta_{PCn}$ in accordance with the priority classes $PC_n$, and the scheduler is configured to select a mobile station #n to which the packets are transmitted preferentially based upon a relationship amongst $Rn^{\alpha pcn}$, $(\overline{Rn}-Rn^{target})^{\beta pcn}$ and $(Rn^{minus})^{\beta pcn}$, wherein $\alpha_{PCn}$ and $\beta_{PCn}$ are within a range $0 \leq \alpha_{PCn}, \beta PCn \leq 1$.

18. The packet transmission control apparatus according to claim 17, wherein the acquirer is configured to further acquire a weighting factor $A_{PC_n}$ in accordance with the priority class $PC_n$, and the scheduler is configured to perform the scheduling to transmit the packets preferentially to a mobile station #n maximizing a value $C_n$ of an evaluation function calculated according to equations $$Cn = Apcn \frac{Rn^{\alpha pcn}}{(\overline{Rn} - Rn^{target})^{\beta pcn}} \quad \text{(when } \overline{Rn} > Rn^{target}\text{)},$$

$$Cn = Apcn \frac{Rn^{\alpha pcn}}{(Rn^{minus})^{\beta pcn}} \quad \text{(when } \overline{Rn} \leq Rn^{target}\text{)}.$$

19. The packet transmission control apparatus according to claim 17, wherein the scheduler is configured to perform the scheduling to transmit the packets preferentially to a mobile station #n maximizing a value $C_n$ of an evaluation function calculated according to equations $$Cn = Apcn \frac{Rn^{\alpha pcn}}{(TTI_{min,n} \cdot (\overline{Rn} - Rn^{target}))^{\beta pcn}} \quad \text{(when } \overline{Rn} > Rn^{target}\text{)},$$

$$Cn = Apcn \frac{Rn^{\alpha pcn}}{(Rn^{minus})^{\beta pcn}} \quad \text{(when } \overline{Rn} \leq Rn^{target}\text{)},$$

by using a minimum transmission time interval $TTI_{min,n}$ at which the mobile station #n can receive the packet.

20. A packet transmission control method for performing transmission control of packets to a plurality of mobile stations, the method comprising:

acquiring an average transmission rate of packets to each of the plurality of mobile stations and a guaranteed transmission rate of the packets, and performing scheduling to transmit packets to a specific mobile station preferentially, when an average transmission rate of the packets to the specific mobile station approaches the guaranteed transmission rate, wherein said step of acquiring further includes, acquiring the average transmission rate $\overline{Rn}$ of the packets to the mobile station #n, the guaranteed transmission rate $R_n^{target}$, a radio condition $R_n$ between a packet transmission control apparatus and the mobile station #n, and predetermined parameters $\alpha$ and $\beta$, and the set of scheduling further includes, selecting a mobile station #n to which packets are transmitted preferentially based upon a relationship between $Rn^\alpha$ and $(\overline{Rn}-Rn^{target})^\beta$, wherein $\alpha$ and $\beta$ are within a range $0 \leq \alpha, \beta \leq 1$.

* * * * *